United States Patent [19]
Warner

[11] Patent Number: 5,938,551
[45] Date of Patent: Aug. 17, 1999

[54] VARIABLE TENSION PULLEY SYSTEM

[75] Inventor: Patrick A. Warner, Boulder, Colo.

[73] Assignee: Schwinn Cycling & Fitness Inc., Boulder, Colo.

[21] Appl. No.: 08/829,131

[22] Filed: Mar. 28, 1997

[51] Int. Cl.$^6$ .............................. F16H 7/08; F16H 7/00; F16H 7/12

[52] U.S. Cl. ............................ 474/111; 474/88; 474/137; 474/138

[58] Field of Search ..................................... 474/114, 122, 474/123, 136, 137, 138, 101, 87–88; 192/11; 482/58, 63, 57, 114, 900, 902

[56] References Cited

U.S. PATENT DOCUMENTS

| | | | |
|---|---|---|---|
| 37,713 | 2/1863 | Van Houten | 474/88 |
| D. 299,371 | 1/1989 | Tsuyama . | |
| D. 307,782 | 5/1990 | Birrell et al. . | |
| D. 334,042 | 3/1993 | Wang . | |
| 691,538 | 1/1902 | Frigerio | 474/87 |
| 716,520 | 12/1902 | Cole | 474/87 |
| 2,753,722 | 7/1956 | De Grave | 474/88 |
| 3,575,058 | 4/1971 | Kraus | 474/109 X |
| 4,555,109 | 11/1985 | Hartmann . | |
| 4,878,397 | 11/1989 | Lennon . | |
| 5,094,124 | 3/1992 | Stonehouse . | |
| 5,135,458 | 8/1992 | Huang . | |
| 5,310,392 | 5/1994 | Lo | 482/63 |
| 5,433,680 | 7/1995 | Knudsen | 482/57 |

OTHER PUBLICATIONS

Schwinn Cycling & Fitness Inc., *Airdyne®Backdraft™ Recumbent Bike*, 1996.
Schwinn Cycling & Fitness Inc., *Airdyne® Windsprint™ Interval Bike*, 1996.

*Primary Examiner*—John A. Jeffery
*Assistant Examiner*—Marcus Charles
*Attorney, Agent, or Firm*—Holland & Hart LLP

[57] ABSTRACT

The variable tension pulley system including a drive pulley, a slave pulley, a belt interconnecting the drive pulley and slave, a tensioner assembly positioned between the drive pulley and the slave pulley and in engagement with the belt. The tensioner assembly includes an elongated rack, a drive rod rotatably positioned on the rack, the drive rod having opposing ends and being selectively rotatable in a positive rotation or a negative rotation. The tensioner assembly also includes a drive block positioned on each end of the rod and in moveable engagement with the rack, each of the drive blocks being moveable along the length of the rod upon rotation of the rod, the drive blocks moving toward each other when the rod is rotated in the positive direction, and the drive blocks moving away from each other when the rod is rotated in the negative direction, a slide block slidably positioned on the rod adjacent to, inside of and in selective engagement with each drive block, and in slidable engagement with the rack, each slide block being moved toward the other slide block by the associated drive block when the drive blocks are moved toward each other, and a tensioner pulley attached to each slide block, each tensioner pulley in engagement with one of the opposing belt spans. The tensioner pulleys displace the opposing belt spans closer together upon positive actuation of the tensioner system in the positive direction. The use of the variable tension pulley system on an upper body exercise machine using a fan is also described.

4 Claims, 16 Drawing Sheets

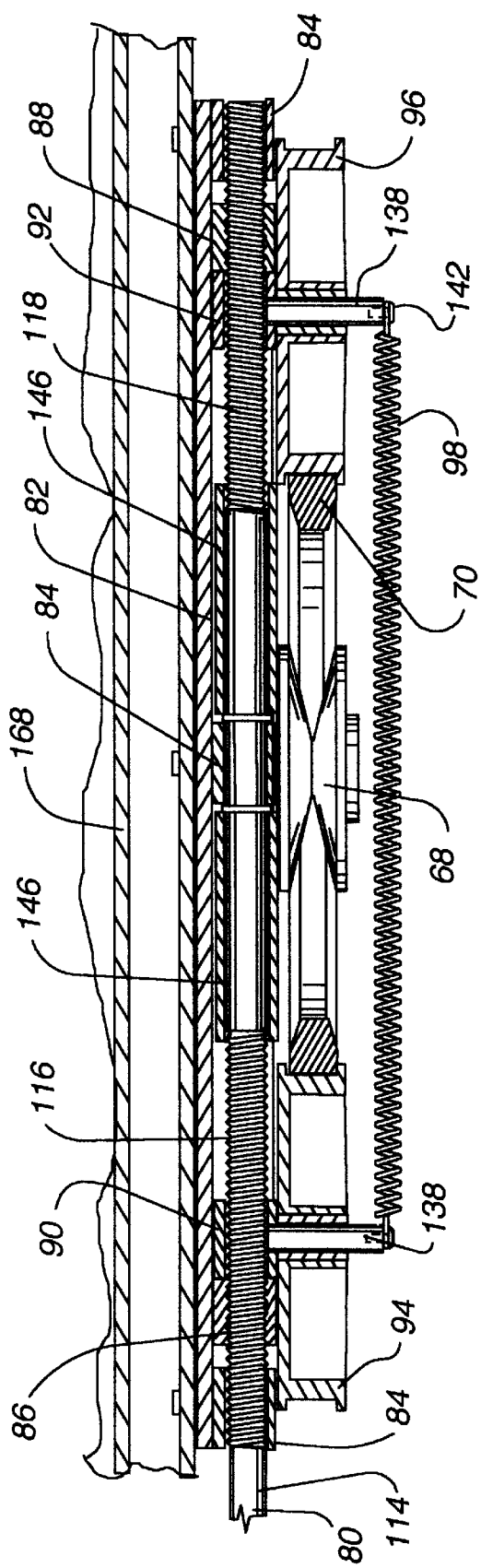

VARIABLE TENSION PULLEY SYSTEM

FIELD OF THE INVENTION

The invention relates to exercise equipment and to pulley systems used in exercise equipment. More particularly, the present invention relates to upper body exercise machines and to the control of lateral displacement of a belt in a pulley system having a variable pitch pulley.

BACKGROUND

Pulley systems are commonly used in exercise equipment to drive resistance loads. One technique which allows a user to vary the resistance of the force against which the user exercises is the incorporation of variable pitch pulleys, or split pulleys, into a slave pulley of the pulley system. This technique requires the position of the belt on the slave pulley to be controlled in a reliable and efficient manner to adjust for low resistance through very high resistance, as desired by the user.

While available belt control systems sometimes utilize variable pitch slave pulleys, problems associated with such systems have not been fully addressed. For example, when removing tension from a pulley belt, the belt can whiplash and jump off a slave or a drive pulley, necessitating reinstallation of the belt onto the pulleys. In some systems, the means of controlling belt tension by application of force to the belt are difficult to operate. In other systems, the means of controlling belt tension are not sufficiently precise to provide accurate changes in resistance to the exercise system.

In another aspect of available exercise systems, upper body exercise machines sometimes utilize the direct drive of an inertial flywheel with resistance adjusted through frictional engagement of a rim brake on the flywheel. Other systems use magnetic brakes, which are cost prohibitive. One limitation of some presently available upper body exercise machines is the utilization of a resistance loading system which does not provide a smooth or accurately adjustable load. Another limitation of some systems is the incorporation of crank arms which are not adjustable for different sized users. Yet another similar limitation is the incorporation of seats which are not easily positioned for the proper utilization of the exercise machine by different users.

It is against this background that the significant improvements and advancements of the present invention have taken place.

SUMMARY OF THE INVENTION

The variable tension pulley system of the present invention includes a drive pulley and a slave pulley, with a belt interconnecting the drive pulley and slave pulley. Portions of the belt extend between the drive and slave pulleys defining thereby opposing belt spans. A tensioner assembly is positioned between the drive pulley and the slave pulley in engagement with the belt. The tensioner assembly includes an elongated rack and a drive member rotatably positioned on the rack and having opposing ends. The drive member is selectively actuatable in a positive or a negative direction. The tensioner assembly also includes a pair of drive blocks, one each positioned on each end of the drive member. The drive blocks are in moveable engagement with the rack and move along the length of the drive member upon rotation of the member. The drive blocks move towards each other when the drive member is rotated in the positive direction and away from each other when the drive member is rotated in the negative direction. A pair of slide blocks are slidably positioned on the drive member, each one in selective engagement with one of the drive blocks. The slide blocks are also in slidable engagement with the rack, moving toward each other when the drive blocks move toward each other. The system also includes a pair of tensioner pulleys, each tensioner pulley attached to a slide block and in operative engagement with one of the opposing belt spans. The tensioner pulleys position the opposing belt spans closer together upon actuation of the tensioner system in the positive direction. While in the preferred embodiment, the tensioner pulleys push both opposing belt spans together, the variable tension pulley system of the present invention can also be configured to engage only one side of the belt on the pulley system.

The variable tension pulley system of the present invention is preferably employed in an exercise machine to control the resistance or load against which the user works. By employing the drive member/drive block configuration of the present invention, lateral motion of the tensioner pulleys is accurately and readily controlled. The drive member provides a sturdy, easily adjustable and stable manipulating mechanism. In addition, the substantially constant engagement of the tensioner pulleys with the belt spans of the present invention helps prevent backlash of the belt upon the removal of the operating force applied to the belt spans.

Accordingly, an object of the present invention is to provide a variable tension pulley system in which the load placed on the belt of the pulley system can be accurately, reliably and easily adjusted. Another object of the present invention is to provide a variable tension pulley system which can be used with a variable pitch pulley and the pitch dimension accurately, reliably, and easily adjusted.

With respect to the upper body exercise machine of the present invention, a frame structure is attached to a seat structure, the frame structure supporting a dual pulley drive system and a resistance load means, such as a fan. The seat structure includes a forwardly and rearwardly adjustable seat assembly in which a chair assembly is mounted to a seat assembly. The length of extension of the crank arms from the crank arm assemblies is adjustable, with the orientation of the crank arms modifiable by the user for different emphasis during exercise. In the preferred embodiment of the upper body exercise machine of the present invention, a fan is employed to provide resistance against which the user exercises. The fan provides smooth resistance at all rpm levels and during acceleration and deceleration. The adjustable resistance allowed by the tensioner assembly also provides the user with an additional benefit by allowing the user to adjust the resistance at a given crank arm assembly rpm level.

Other aspects, features and details of the present invention can be more completely understood by reference to the following detailed description of a preferred embodiment, taken in conjunction with the drawings, and from the appended claims.

BRIEF DESCRIPTION OF THE DRAWINGS

FIG. 6 is an enlarged partial section taken along line 6—6 of FIG. 3.

FIG. 7 is an enlarged partial section taken along line 7—7 of FIG. 3.

FIG. 8 is an enlarged partial section taken along line 8—8 of FIG. 3.

DETAILED DESCRIPTION

Figure 1:
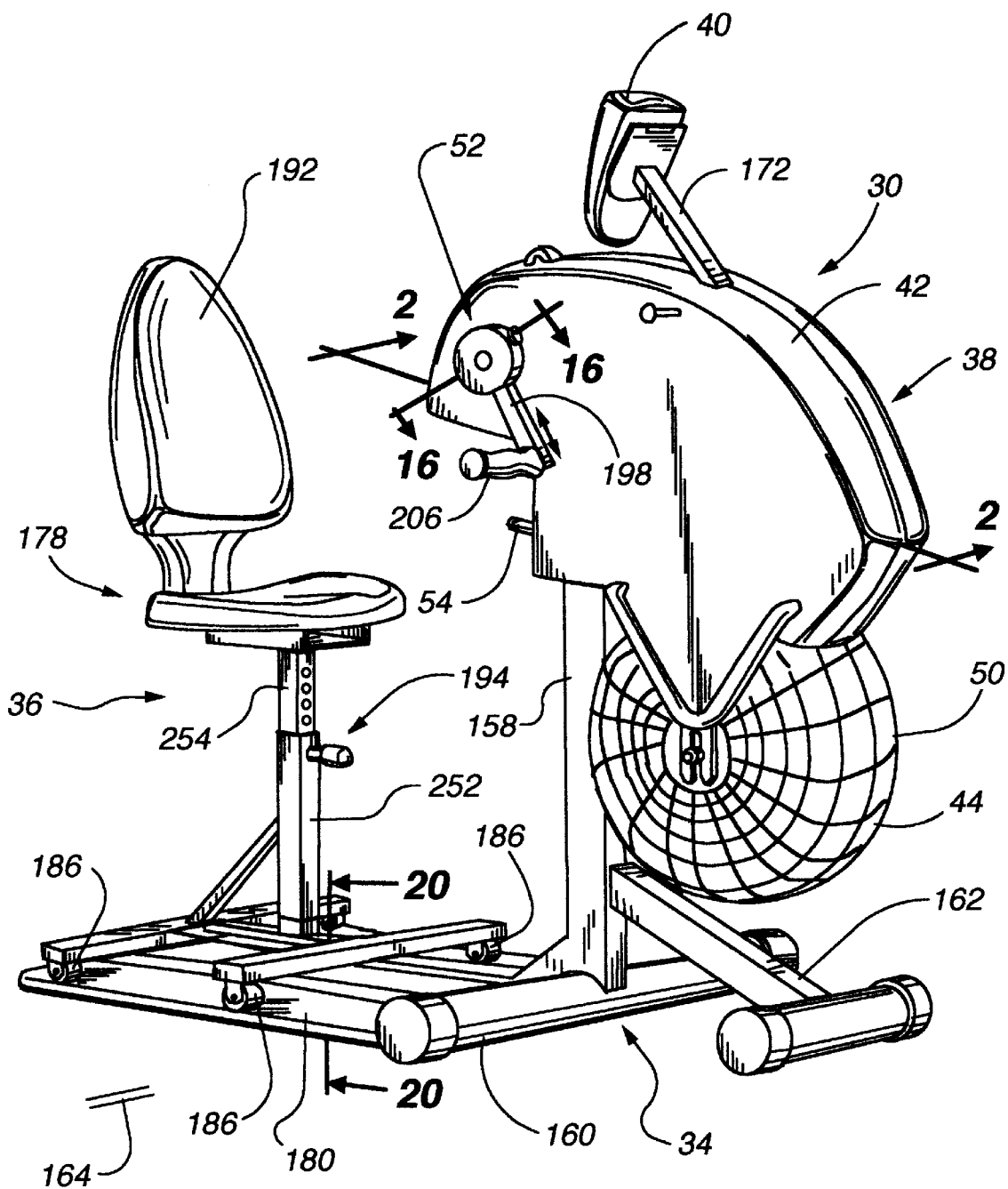
FIG. 1 is a perspective view of an exercise machine incorporating the variable tension pulley system of the present invention.

An exercise machine 30 incorporating the variable tension pulley system 32 of the present invention is shown in FIG. 1. The exercise machine includes a frame structure 34, an adjustable seat structure 36 mounted to the frame structure 34, an exercise assembly 38 attached to the frame structure, and a computer monitor 40 or display. The exercise assembly 38 is contained in a top housing portion 42 and a bottom housing portion 44, and includes a plurality of pulley systems 46 and the resistance means 48. In the preferred embodiment, the resistance means 48 is a rotary fan 50, such as the fan described in U.S. Pat. No. 5,211,613. A rotary hand-crank or crank-arm assembly 52 is connected to the resistance means through the pulley systems 46, with operation of the rotary hand-crank 52 driving the resistance means 48 through the pulley systems 46. Movement of the hand-crank is opposed by air resistance built up by the fan 50 as it rotates.

An adjustment turn-handle 54 extends from the front of the top housing portion 42 and attaches to a variable tension pulley system 32 of the present invention. The turn-handle 54 is used to adjust the tension on one of the pulley systems to increase or decrease the resistance felt by the user during the workout, as is described in greater detail below. The computer monitor 40 displays various performance indicators, such as exercise time, resistance, fan revolutions per minute (rpm), water, and calories burned, among other information. It should be understood that while the use of adjustable pulley systems 32 of the present invention has found particular utility for use in an exercise machine like that shown in FIG. 1, it is contemplated that the variable tension pulley system of the present invention has many other applications, including use in pulley systems using more than two pulleys in each system, or in situations where more or less than two pulley systems are linked together.

Figure 2:
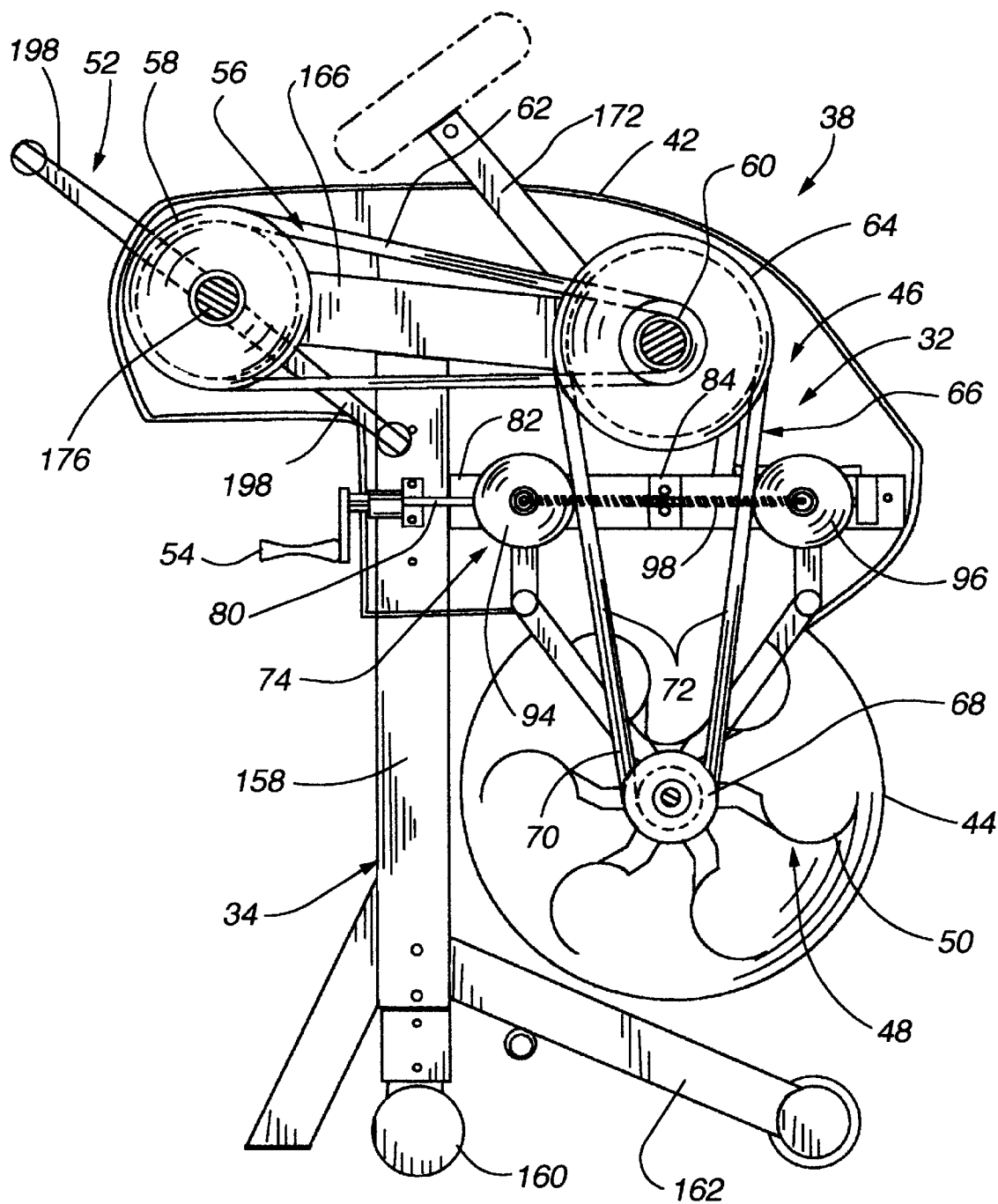
FIG. 2 is a section taken along line 2—2 of FIG. 1.

Referring now to FIG. 2, it can be seen that the hand-cranks (crank-arm assembly 52) are attached to a first pulley system 56. The first pulley system 56 includes a drive pulley 58, a slave pulley 60, and a belt 62 attached between the two pulleys 58, 60. The slave pulley 60 of the first pulley system 56 is attached to a drive pulley 64 of a second pulley system 66. The second pulley system includes a drive pulley 64 and a slave pulley 68 operatively connected by a belt 70, with the drive pulley and the slave pulley spaced apart and rotatably mounted on the frame structure 34. In the configuration shown, when the hand-cranks 52 are turned, the drive pulley 58 of the first pulley system is directly rotated while the slave pulley 60 of the first pulley system 56 is rotated by action of the first pulley system belt 62. The drive pulley 64 of the second pulley system 66 is rotated by action of the slave pulley 60 of the first pulley system 56. The belt 70 of the second pulley system 66 then engages the drive 64 and slave pulleys 68 of the second pulley system 66 such that when the drive pulley 64 is rotated by the first pulley system 56, the slave pulley 68 of the second pulley system 66 is rotated by action of the belt 70 extending between the drive 64 and slave 68 pulleys of the second pulley system 66. The rotary fan 50 is rigidly attached to the slave pulley 68 of the second pulley system 66 and creates air resistance as it rotates through the air under the power of the slave pulley 68 of the second pulley system 66. The first pulley system can include gears and chains, or timing pulleys, since it is only a drive mechanism and is not adjusted or modified in any way during use.

Figure 9:
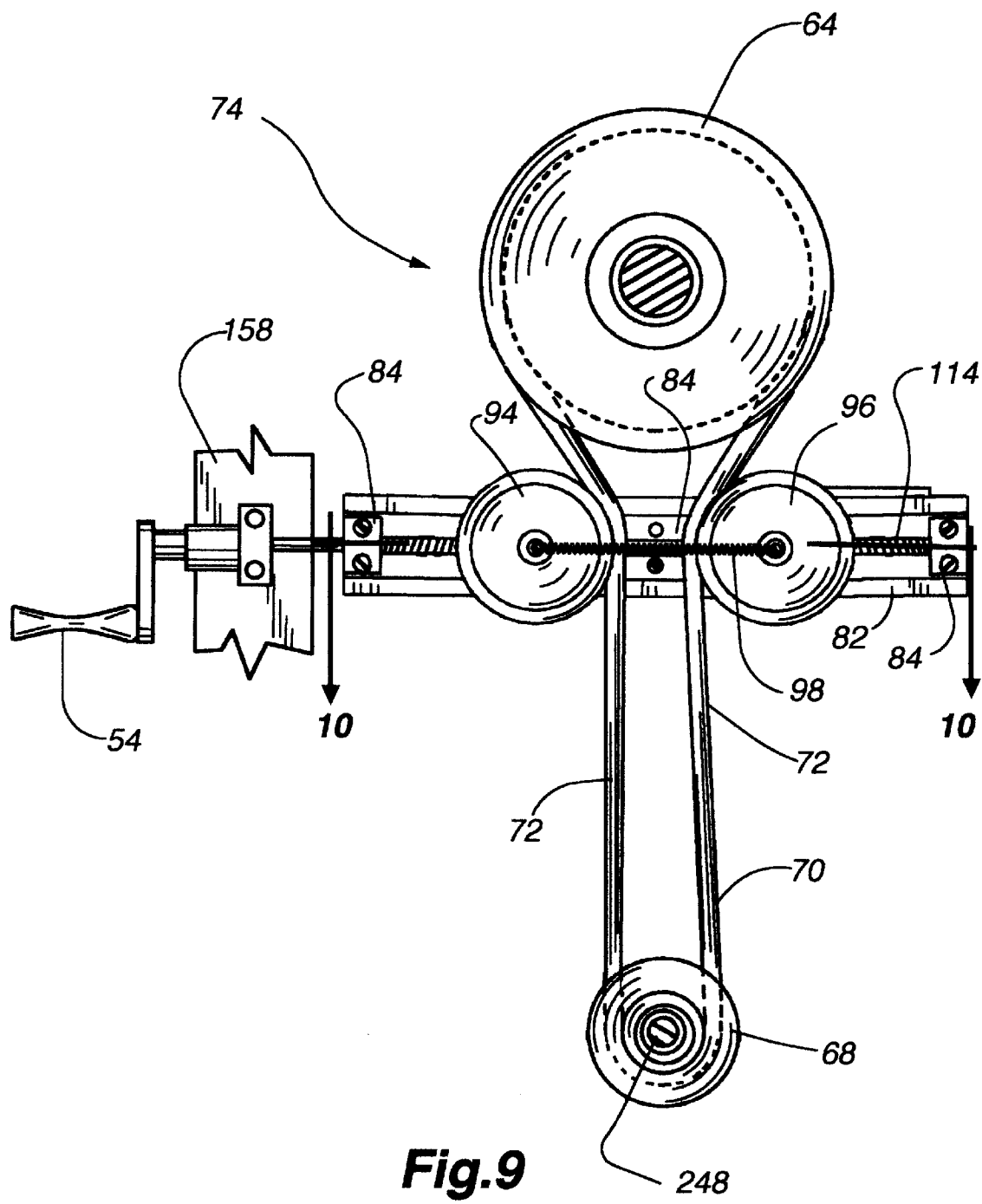
FIG. 9 is a view of the second pulley system incorporating the tensioner assembly of the variable tension pulley system of the present invention, with the tensioner assembly in an inner position.

The second pulley system 66 includes a variable tension mechanism that is attached to the frame structure 34 for support, but acts upon the belt extensions 72 (belt spans) extending between the drive 64 and slave pulleys 68 of the second pulley system. The variable tension apparatus 74 controls the position of the belt 70 on the slave pulley 66 of the second pulley system by adjusting the space between the opposing belt spans 72. The spacing can be changed from the spacing naturally occurring in the free operation of the second pulley system 66, as shown in FIG. 2, to a closer spacing, as represented in FIG. 9, and any increment therebetween. As the distance between the belt spans decrease, the tension on the belt 70 increases and the position of the belt on the slave pulley changes, thus increasing the gear ratio on the drive system 46 between the hand-crank 52 and the fan 50, thus making it harder for the user to turn the hand-cranks. As the hand-cranks 52 are turned at a higher rpm by the user, the fan is driven at a higher rpm depending on the gear ratio, thus creating more load due to air resistance.

Preferably, the slave pulley 63 of the second pulley system 66 is a variable pitch, or split, pulley such that when the variable tension apparatus 34 (tensioner assembly) is engaged to increase the tension on the belt 70 by moving the belt spans 72 closer together, the belt, as it moves around the variable pitch slave pulley 68 reduces the pitch dimension (the halves 76, 78 of the slave pulley 68 spread apart to reduce the diameter about which the belt circumferentially extends). The reduced pitch dimension effectively "gears up" (increases the gear ratio of) the second pulley system 66, and the overall pulley system 46, such that it is more difficult to turn the hand-cranks 52 during a workout.

The two ways to increase load resistance while using the exercise machine 30 including the variable tension apparatus 74 of the present invention are to: 1) turn the crank arm assemblies 52 at a higher rpm to rotate the fan 50 faster, creating more air resistance, or 2) adjust the variable tension apparatus 74 to change the gear ratio ("gear-up") between the drive pulley 64 and the slave pulley 68 attached to the fan 50. Increasing the gear ratio makes it more difficult to turn the fan 50 by reducing the effective pitch on the slave pulley 68.

The variable tension apparatus 74 maintains the desired tension on the belt 70 to maintain the fixed pitch dimension on the slave pulley 68 of the second pulley system, which, in turn, maintains the desired load on the crank arm assembly 52. The engagement of the variable tension apparatus 74 with the belt 70 is controlled by the user through the turn-handle 54. The turn-handle 54 is able to be rotated in the clockwise and counter-clockwise directions. As described in this embodiment, the clockwise rotation of the turn-handle 54 increases the tension on the belt 70 (moves the belt spans 72 closer together), and is referred to as the "positive" direction. Rotation of the turn-handle 54 in the counter-clockwise direction reduces the tension created in the belt 70 by the engagement of the variable tension apparatus (moves belt spans 72 further apart) and is termed the "negative" direction. turning the turn-handle actuates a drive member 80 of the tension apparatus 74 in either a positive or negative direction.

The variable tension apparatus 74 is applied to the second pulley system. As is shown in more detail in FIG. 3, the variable tension apparatus, as applied to the structure of the second pulley system as described above, includes an elongated rack 82 which rotatably supports the drive member 80 (preferably a lead screw), the drive member 80 being actuatable by the turn-handle 54. The rack also supports retainer blocks 84 fixably positioned at either end, and in the middle, of the rack, left 86 and right 88 drive blocks, left 90 and right 92 slide blocks, a pair of left 94 and right 96 tensioner pulleys, each rotatably mounted to the corresponding slide blocks, and a tension spring 98 attached between the slide blocks 90, 92.

Figure 4:
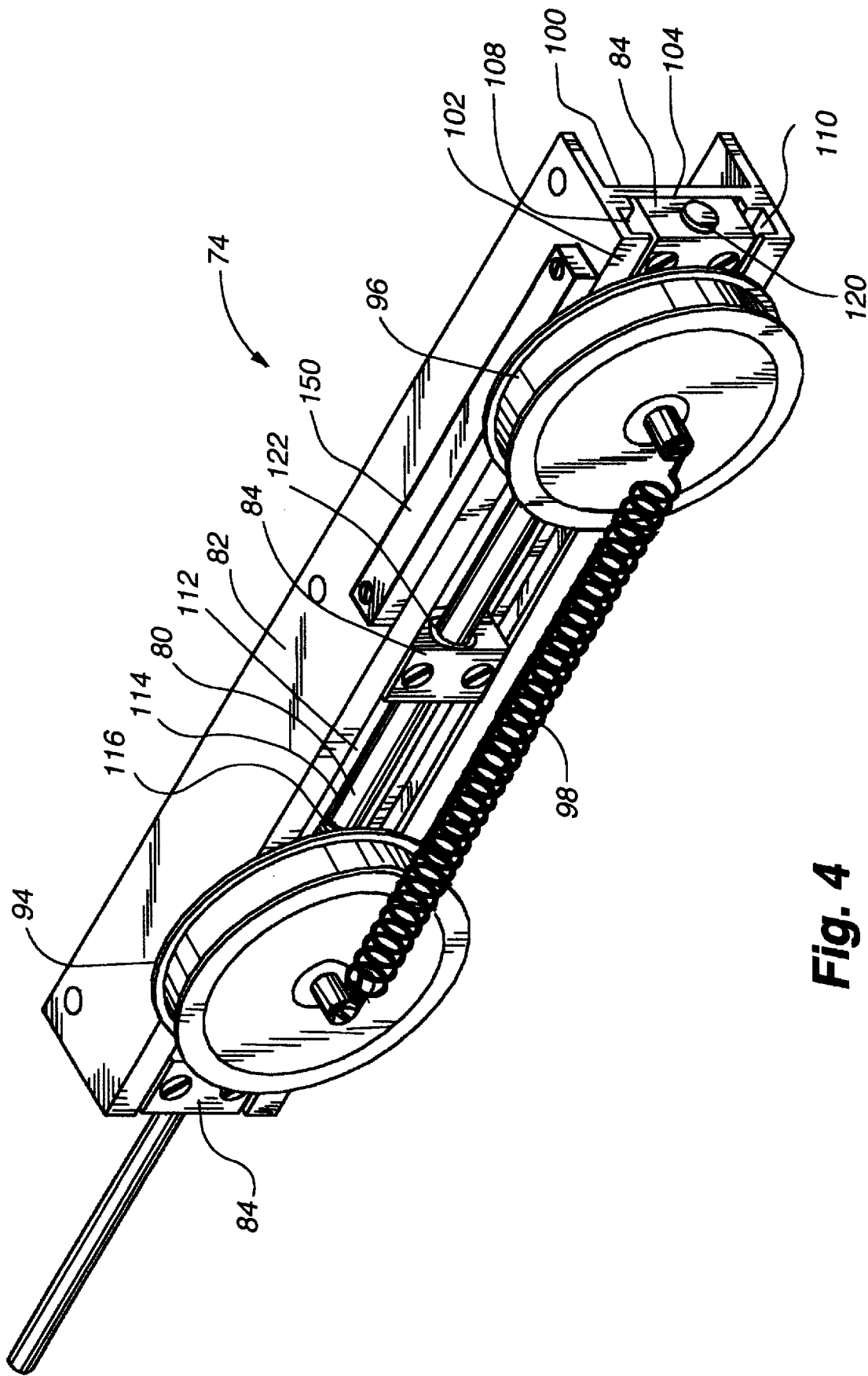
FIG. 4 is an enlarged perspective view of the tensioner assembly.
Figure 5:
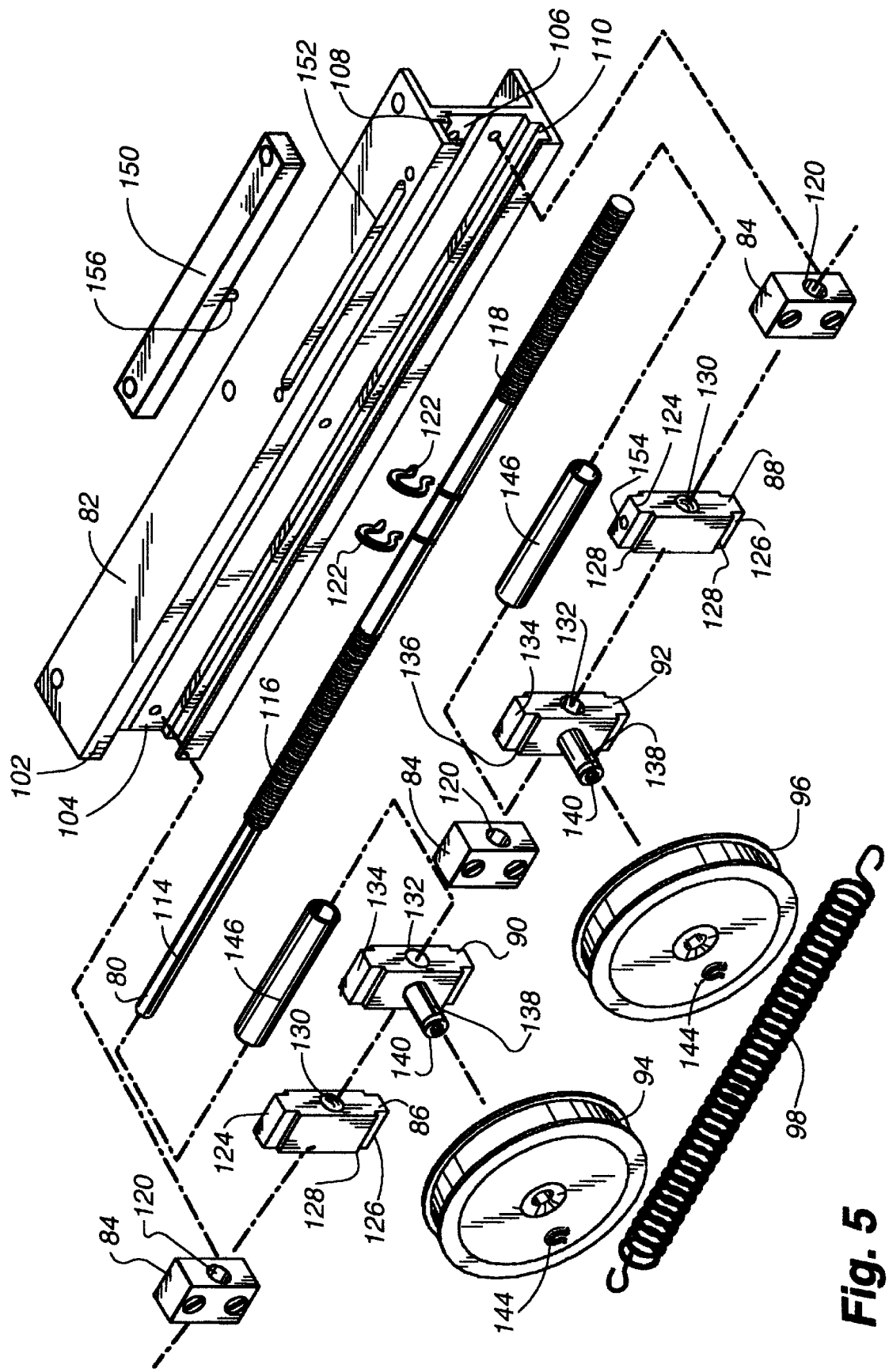
FIG. 5 is an exploded view of the tensioner assembly shown in FIG. 4.

A description of the assembly of the variable tension apparatus 74 at this point will illuminate its unique structure and function. Referring to FIGS. 4 and 5, it can be seen that the rack 82 is a modified I-beam, and is preferably made of extruded aluminum. The back side 100 of the rack engages a portion of the frame structure 34 to secure the tensioner assembly 74 thereto. The front side 102 of the rack defines a modified C-shaped groove 104 for slidably retaining the drive blocks 86 and 88 and the slide blocks 90 and 92. The C-shaped groove 104 defines a back recess 106, a top recess 108, a bottom recess 110, and an open front 112, each of these features being continuous along the length of the rack 82 to allow for the sliding movement of the drive blocks 86 and 88 and slide blocks 90 and 92 along the length of the rack 82. The rack could be any structure that allows guided sliding movement of the slide and drive blocks, such as parallel cylindrical rods.

The rack 82 supports the drive member 80 along which the drive and slide blocks move, as is described further below. The drive member can be a lead screw, rack gear, or any structure that suitably causes a body engaging the drive member to move along the length of the drive member in a known fashion when the drive member is actuated. In the preferred embodiment, the drive member is a threaded drive rod 114. The rod 114 is cylindrical and has two threaded sections 116 and 118. The rod 114 is rotatably positioned in the rack 82 and extends along the length of the rack. Retainer blocks 84 are fixed in the C-shaped groove 104 at either end, and in the middle, of the front 102 of the rack, with each retainer block 84 defining an aperture 120 formed therethrough for receiving the rod and rotatably supporting it therein. A retainer clip 122 is positioned on the rod 114 on each side of the middle retainer block 84 to keep the rod 114 from being pushed through or pulled out of the retainer blocks 84, and to stabilize its lateral position in the rack 82 during use. Each of the retainer blocks 84 are attached to the rack by screw fasteners. One end of the rod 114 extends through the end retainer block 84 and is attached to the turn-handle 54. The turn-handle 54 allows the user to rotate the rod 114 along the rod's longitudinal axis, as supported by the retainer blocks.

The threaded section 116 of the rod nearer the turn-handle end is right-hand threaded, and the threaded section 118 nearer the distal end of the rod 114 opposite the turn-handle is left-hand threaded in the preferred embodiment, as is described below.

Each drive block 86 and 88 has a top tongue extension 124 and a bottom tongue extension 126 that are received in the top 108 and bottom 110 recesses of the rack 82, respectively. A shoulder 128 is formed on the front and back of each of the drive blocks 86 and 88 at the base of each of the top 124 and bottom 126 tongues. The upper tongue 124 fits into the top recess 108, while the front and rear shoulders 128 provide further alignment orientation for the drive block 86 or 88 as the drive block moves along the length of the rack 82. The bottom tongue fits into the bottom recess 110. Each drive block 86 or 88 defines a threaded aperture 130 formed laterally therethrough. As shown and described in the present application, the drive block nearer the turn-handle 54 end of the rod 114 is termed the left drive block 86, and the drive block nearer the distal end of the rod is termed the right drive block 88. The aperture 130 in the left drive block is right-hand threaded so as to receive the right-hand threaded section 116 of the rod 114. The aperture 130 in the right drive block 88 is left-hand so as to receive the left-hand threaded section 118 of the rod 114. When the left 86 and right 88 drive blocks are threaded onto the rod 114 on the respective threaded sections 116 or 118, the left 86 and right 88 drive blocks are also slidably engaged in the rack 82, but the movement of each of the left and right drive blocks is controlled by the rotation of the rod 114 about its longitudinal axis. As the rod 114 is turned in the clockwise direction (positive direction), the left drive block 86 moves towards the distal end of the rod 114 due to the threaded engagement of the rod with the left drive block. At the same time, the right drive block 88 moves towards the turn-handle 54 end of the rod 114 due to the threaded engagement between the left-hand threaded section of the rod and the right drive block. The positive rotation of the rod 114 moves the drive blocks closer towards one another, while the negative rotation of the rod moves the drive blocks apart from one another.

The slide blocks 90 and 92 are slidably positioned on the rod 114. The left slide block 90 is positioned adjacent to but inside the left drive block 86, and the right slide block 92 is positioned adjacent to and inside the right drive block 88. The slide blocks define apertures 132 formed laterally therethrough, which are dimensioned to easily slide over the entire length of the rod 114, including the threaded sections.

A tongue 134 is formed at the top and bottom of each slide block 90 and 92 for insertion into the top 108 and bottom 110 recesses extending along the length of the front 102 of the rack 82. A shoulder 136 is formed on the front and back of each of the slide blocks 90 and 92 at the base of each of the top and bottom tongues 134. As shown in FIG. 7, the upper tongue 134 fits into the top recess 108, while the front and rear shoulders provide further alignment orientation for the slide block as the slide block moves along the length of the rack. The bottom tongue 134 similarly fits into the bottom recess 110. A pin 138 extends perpendicularly outwardly from the front face of each of the slide blocks 90 and 92. The pin 138 is cylindrical in shape and has a threaded aperture 140 formed axially through its end.

Each pin 138 rotatably receives a tensioner pulley 94 or 96. Each tensioner pulley 94 or 96 rotates freely on the pin 138 as a result of a journal bearing positioned between the pin and the inside diameter of the bore formed through the tensioner pulley. Each tensioner pulley has outer flanges and an inner flat-profiled base. The flat-profiled base accommodates the back side of the V-shaped belt 70, and the outer flanges help keep the belt aligned on the tensioner pulley. The left tensioner pulley 94 is attached to the left slide block 90, while the right tensioner pulley 96 is attached to the right slide block 92. The tension spring 98 is mounted to the end of each of the pins 138 to bias the slide blocks 90 and 92 towards one another in engagement with the belt 70, as is described further below. Each end of the tension spring 98 is secured to the appropriate pin 138 by a screw 142 threaded into the axially threaded aperture formed in the end of the pin.

When the rod 114 is rotated, by the turn-handle 54, in the positive or clockwise direction, the left 86 and right 88 drive blocks are moved inwardly towards one another. As the left and right drive blocks move inwardly, they push the left 90 and right 92 slide blocks, respectively, towards one another also. The right 94 and left 96 tensioner pulleys, attached to the right 90 and left 92 slide blocks, respectively, move inwardly towards each other in conjunction with the movement of the right and left slide blocks. As described below, the tension spring 98 connected between the pins 138 extending from the left 90 and right 92 slide blocks maintains the right 94 and left 96 tensioner pulleys in continuous contact with the belt spans 72, regardless of the position of the drive blocks 86 and 88. The tensioner pulleys 94 and 96 are held on the pins by retainer clips 144.

While the left 90 and right 92 slide blocks can slide over the entire drive rod 114, the left 86 and right 88 drive blocks can only move where the appropriate threading is located on the drive rod 114. If the drive blocks 86 and 88 are moved to the end of the threading, the threading on rod 114 or the threading on the drive blocks 86 or 88, or both, can be damaged. To avoid such damage, a sleeve 146 is positioned on either side of the middle retainer 84 to cover a portion of the threading (sections 116 and 118) upon which the drive blocks 86 and 88 move. An example of the application of the sleeves 146 to the rod are shown in FIGS. 5, 6, 10, and 13. When a drive block engages the sleeve, the sleeve resists and can impede the further inward movement of the respective drive block to keep the threads from becoming damaged. The sleeves can be made of plastic or metal, or any suitable material. The drive rod 114 can be fully threaded along its length, in which case the sleeve establishes an innermost position of the drive block by impeding any further movement along the existing threads. Only one sleeve could be used to effectively inform the user that the drive blocks should not be moved inwardly any further, by actuation of the tension assembly, due to the resistance created by the interference of the sleeve with the drive block.

The following sections describe the operation of the variable tension pulley system, and specifically the tensioner assembly. Referring now to FIGS. 3, 6, 7 and 8, the second pulley system 66 is shown in the free operating position where the tensioner assembly 74 has not moved the belt 70 appreciably to create additional tension in the belt. The tensioner pulleys 94 and 96 are preferably in contact with the belt 70 in this position; if they are in contact with the belt 70, no appreciable displacement of the belt is resulting. However, in the free position the pulleys 94 and 96 do not need to be in contact with the belt 70. The left 86 and right 88 drive blocks are positioned in their substantially outermost position, while the existing tension in the belt 70 forces the left 90 and right 92 slide blocks outwardly, possibly to engage the inside-facing surface of each of the left 86 and right 88 drive blocks such that the slide blocks 90 and 92 are fixed in position and cannot move outwardly nor inwardly. The outwardly directed force created by the belt 70 overcomes the inwardly-biasing force generated by the spring such that the spring 98 is extended to an outstretched position. As is shown in FIG. 8, the belt 70 is positioned in the variable pitch pulley at the outer diameter, where the gear reduction is approximately 2:1 between the drive 64 and slave 68 pulleys. As can be seen in FIG. 8, the inner portion 76 of the slave pulley 68 is not deflected away from the outer portion 78 of the slave pulley at this level of belt tension since the force created by the belt tension is not sufficient to overcome the force of the compression spring holding the inner 76 and outer 78 pulley portions in their closest position relationship.

Figure 10:
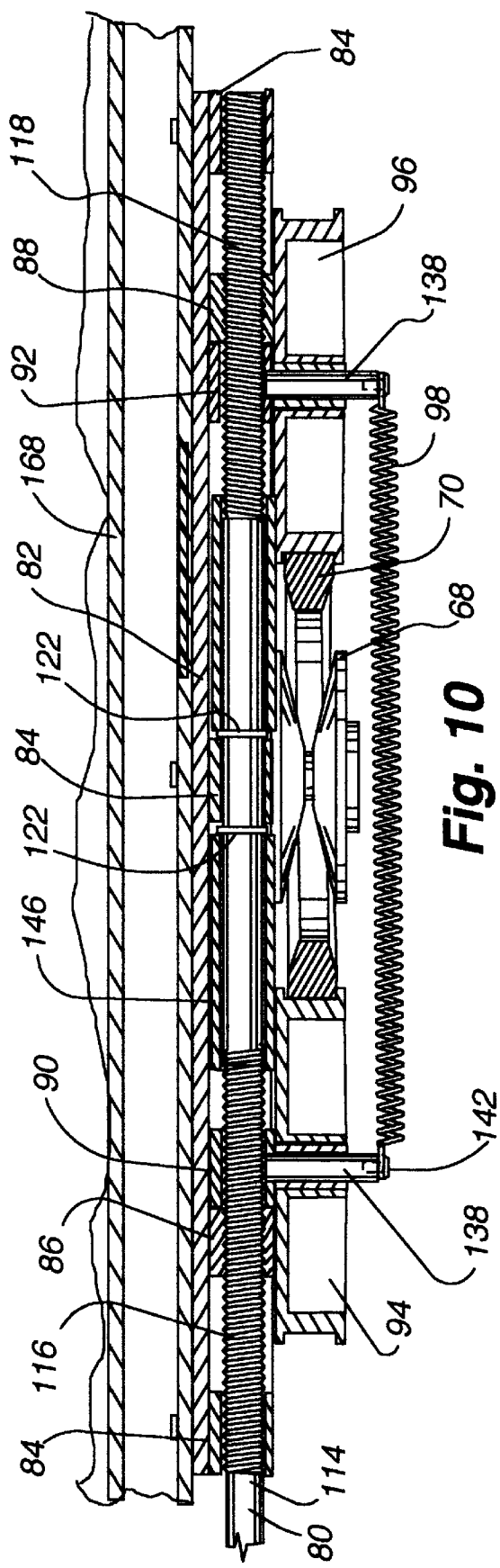
FIG. 10 is an enlarged partial section taken along line 10—10 of FIG. 9.
Figure 11:
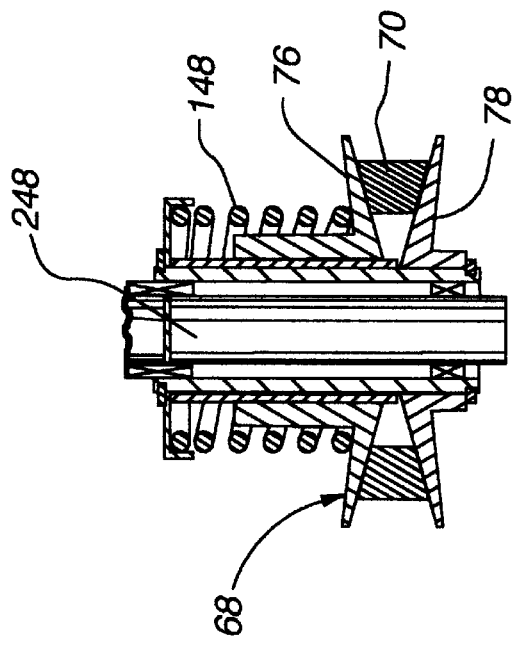
FIG. 11 is an enlarged partial section taken along line 11—11 of FIG. 9.

The second pulley system 66, as shown in FIGS. 9, 10 and 11, shows the tensioner assembly 74 holding the belt spans 72 at an inner position, creating a higher level of tension to the belt 70, and where the left 86 and right 88 drive blocks, and hence the left 90 and right 92 slider blocks, are necessarily in their innermost position. At this high level of position of deflection or displacement of the belt spans 72, the left 94 and right 96 tensioner pulleys are engaged with the outer surface of the belt spans 72 by the actuation of the drive rod 114 in the positive direction. The actuation of the drive rod 114 in the positive direction moves the drive blocks 86 and 88 closer together, and as a result, the slide blocks 90 and 92 are moved toward one another to the same extent the drive blocks are moved toward one another. This causes the tensioner pulleys to engage the outer surface of the belt spans 72. Since the belt 70 is of a substantially fixed length, the displacement of the belt from the normal or free position to this inner position under the force of the drive blocks 86 and 88 pulls the belt to the inner position on the variable pitch slave pulley 68, as shown in FIG. 11. The movement of the belt 70 to a smaller diameter on the variable pitch slave pulley 68 pushes the inner portion 76 of the pulley away from the outer portion 78 of the pulley, which allows the belt 70 to move to the proper intermediate position. This new reduced pitch dimension changes the gear ratio from approximately 2:1 to approximately 4:1, and thus increases the resistance to the user. The tension force in the belt 70, increased by the inward displacement of the belt by the tensioner assembly 74, overcomes the relative force of the spring 148 holding the first 76 and second 78 portions of the variable pitch slave pulley 68 together, thus allowing the belt 70 to move to a balanced pitch position and as a result affects the gear ratios accordingly. The operation of variable pitch pulleys 68 is well known in the art. A variable pitch pulley 68, such as Econoline model #4005 made by Lovejoy, Inc., as shown in the Power Transmission Products Catalogue #685144-50174 printed October, 1995, could be used for this application.

As can be seen in FIG. 10, the left 86 and right 88 drive blocks have been moved inwardly due to the positive rotation of the drive rod 114. The inward movement of the left 86 and right 88 drive blocks pushes the left 90 and right 92 slide blocks inwardly the same distance such that the left 94 and right 96 tensioner pulleys engage the outer surface of the belt spans 72 and moves them additionally inwardly to the same extent the drive blocks 86 and 88 are moved inwardly. The tension spring 98 contracts to adjust to the shorter length between the centers of the left 94 and right 96 tensioner pulleys.

Figure 3:
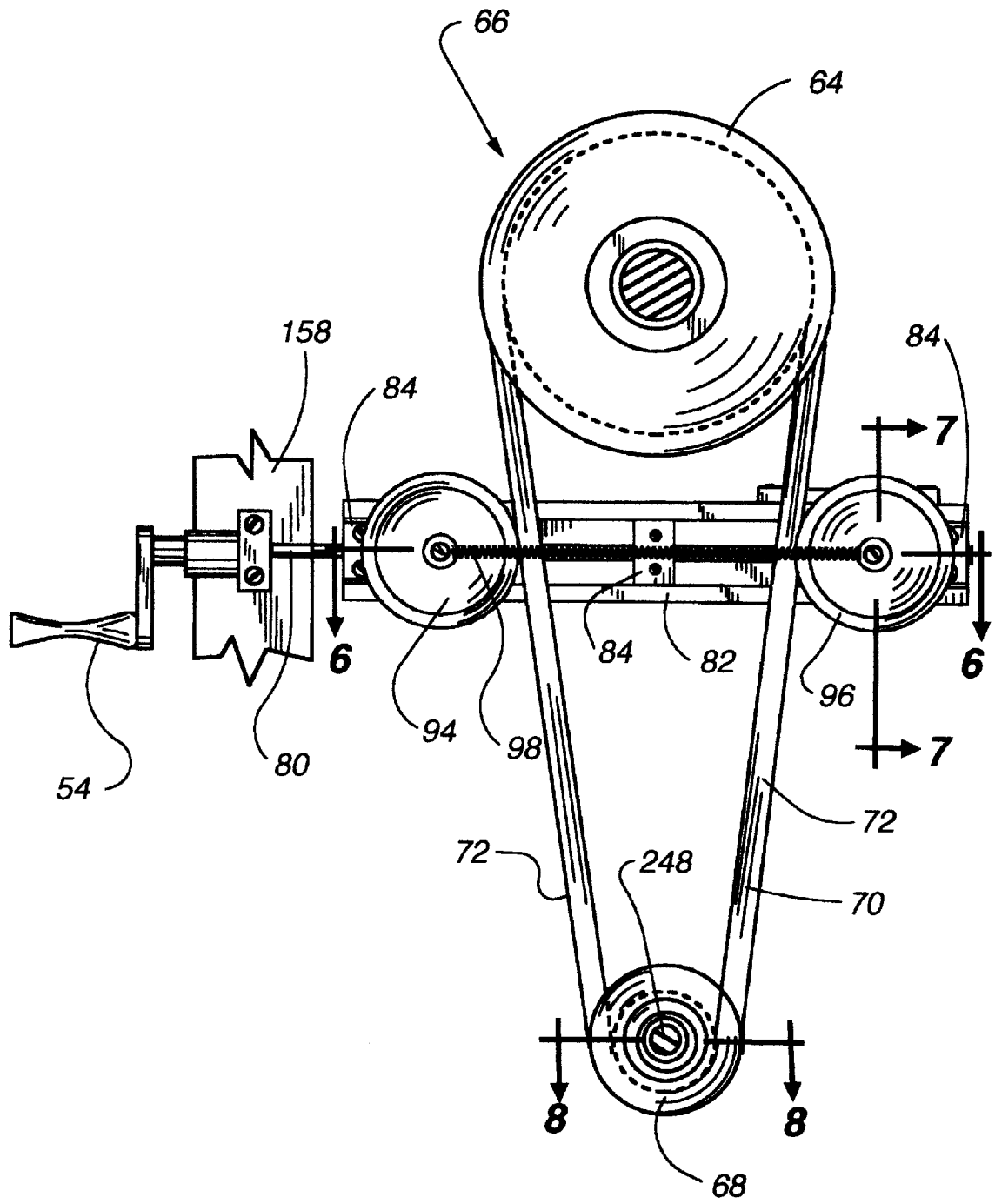
FIG. 3 is a view of the second pulley system incorporating the tensioner assembly of the variable tension pulley system of the present invention, with the tensioner assembly in an outer position.
Figure 12:
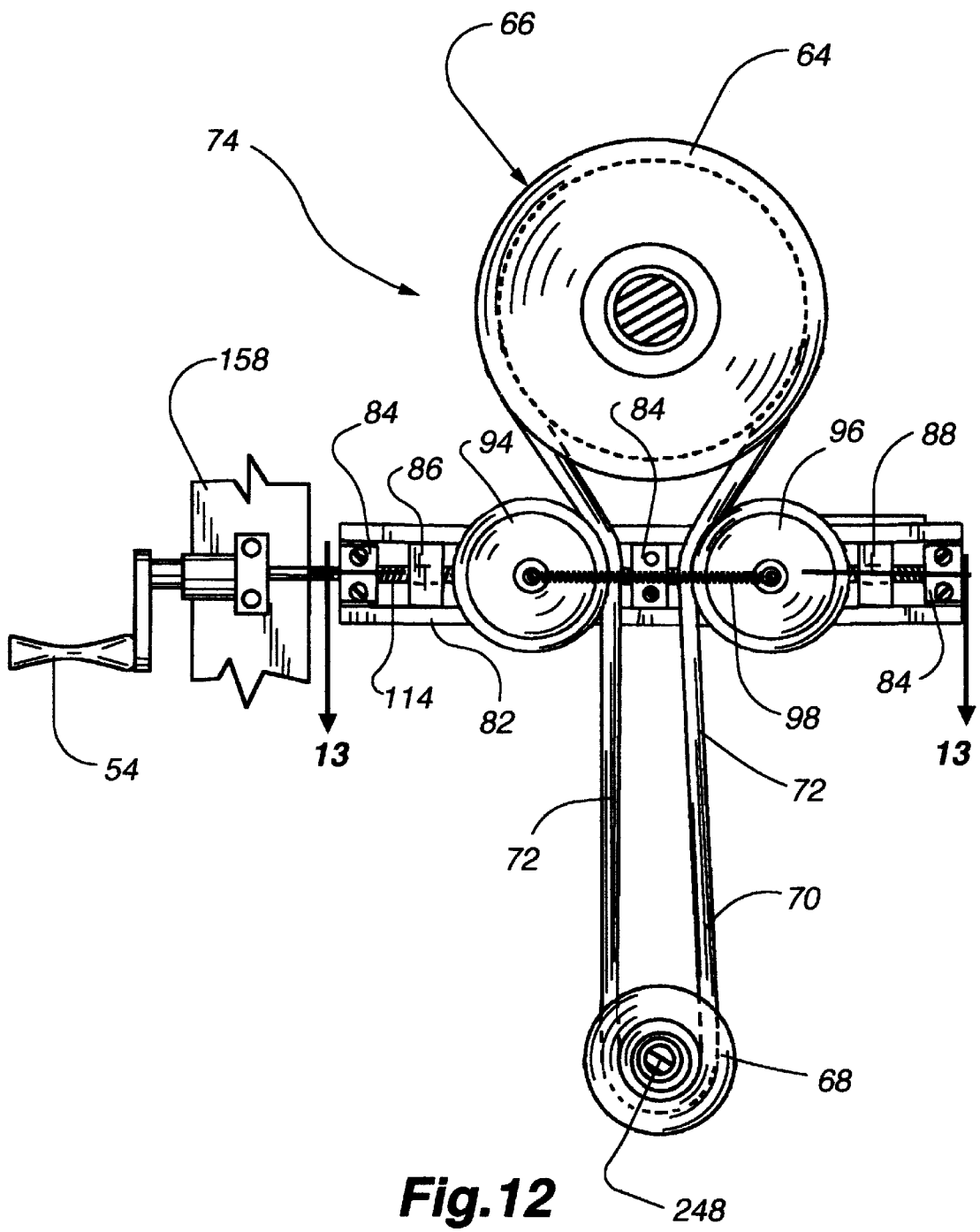
FIG. 12 is a view of the second pulley system incorporating the tensioner assembly of the variable tension pulley system of the present invention, with the tensioner assembly transitioning from the inner position to the outer position.

As shown in FIG. 12, the drive blocks 86 and 88 have been moved outwardly from the positions shown in FIGS. 9 and 10. This is done when the user wishes to decrease the resistance against which the user exercises. As shown in FIG. 12, while the drive blocks 86 and 88 have been moved outwardly, the slide blocks 90 and 92 have not moved outwardly since the slide blocks 90 and 92 are not attached to the drive blocks 86 and 88. The slide blocks 90 and 92, and hence the left and right tensioner pulleys 94 and 96, are held in engagement with the appropriate belt spans 72 under the contracting force of the tension spring 98. The belt 70 does not immediately move to the free-spinning position, as shown in FIGS. 3 and 6, because it is retained in position due to the compression between the inner 76 and outer 78 portions of the variable pitch slave pulley 68. It takes up to a few belt revolutions around the second pulley system 66 before the pitch position or pitch dimension of the variable pitch slave pulley 68 adjusts for the lessened tension resulting from the outward movement of the drive blocks 86 and 88.

Figure 13:
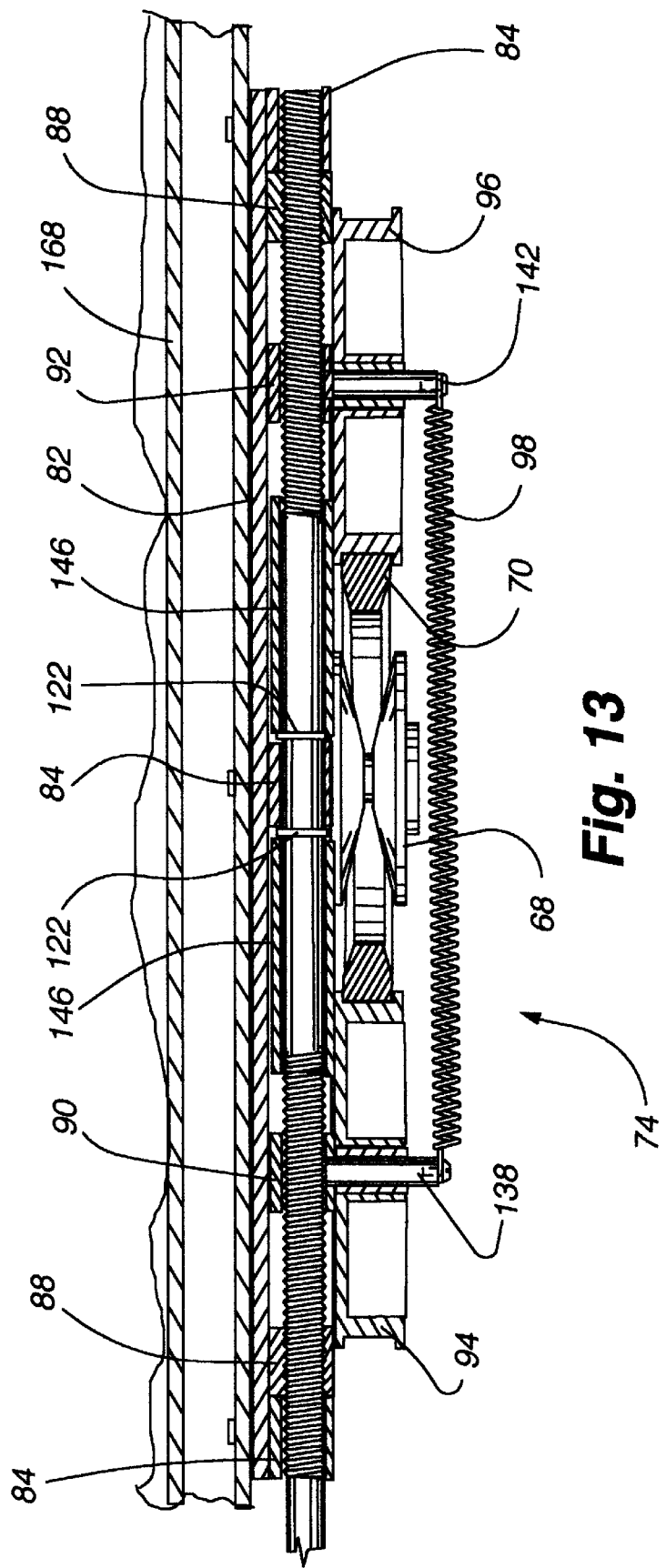
FIG. 13 is an enlarged section taken along line 13—13 of FIG. 12.

As the tension is relieved in the belt by the outward movement of the drive blocks 86 and 88, the belt will assume a position spaced outwardly from the hub of the variable pitch slave pulley 68, and allow the inner 76 and outer 78 portions of the slave pulley 68 to move towards one another under the force of the compression spring 148 (e.g., back to the position shown in FIG. 8). This, in turn, will move the belt 70 spans outwardly from one another, which will push the left 94 and right 96 tensioner pulleys outwardly, and thus push the slide blocks 90 and 92 outwardly in the rack 82. The outward force of the belt 70 overcomes the contracting force of the tension spring 98 such that the spring simply extends. The spring acts to maintain engagement between the left 94 and right 96 tensioner pulleys in the interim between when the drive blocks 86 and 88 are moved outwardly to decrease the tension against the belt 70, and the belt 70 readjusts itself on the variable pitch slave pulley 68. FIG. 13 shows this interim position clearly, prior to the outward movement of the tensioner pulleys 94 and 96 under the force of the belt 70.

In sum, if the user desires to increase the resistance against which he or she exercises, the turn-handle 54 is manipulated in the positive direction to cause the tensioner assembly 74 to apply an inwardly-directed force through the left 94 and right 96 tensioner pulleys to decrease the space between the belt spans 72, which, in turn, changes the pitch position of the belt 70 on the variable pitch slave pulley 68, thus increasing the gear ratio between the drive 64 and slave 68 pulley on the second pulley system 66. The pitch position is a position reflecting the balance of the tension force of the belt 70 created by the tensioner assembly 72 and the compression force of the spring 148, or other biasing force, in the variable pitch slave pulley 68. The V-belt 70 comes to a balanced pitch position between the inner 76 and outer 78 slave pulley portions.

If or when the user decides to decrease the resistance against which the exerciser is working, the exerciser simply turns the turn-handle 54 in the negative (counter-clockwise) direction, which moves the drive blocks 86 and 88 outwardly. Initially, as explained above, the belt spans 72 do not move immediately outwardly due to the clamping force of the inner 76 and outer 78 portions of the variable pitch slave pulley 68 on the belt 70 as it contacts the slave pulley 68. In this position, the left 94 and right 96 tensioner pulleys are maintained in engagement with the belt to facilitate a smooth transition of the belt 70 from the inner position (FIGS. 9, 11, 12) to the outer position (FIGS. 3 and 8) under the force of the tension spring 98. As the pitch position of the belt 70 adjusts on the variable pitch slave pulley 68 (moves outwardly on the slave pulley), the space between the belt spans 72 increases, such outward movement overcoming the force of the tension spring 98, thus moving the left 94 and right 96 tensioner pulleys, and associated left 90 and right 92 slide blocks, outwardly. It is important to note that the drive blocks 86 and 88 can be continuously moved to virtually any position between the outermost and innermost positions due to the threaded engagement between the rod 114 and the drive blocks 86 and 88.

The position of the drive blocks 86 and 88, with respect to the free or outermost position where substantially no force is applied by the left or right tensioner pulleys 94 and 96 on the belt spans 72 is indicated by a potentiometer 150 mounted on the top surface of the rack 82. A slot 152 is formed through the top surface of the rack 82 above the range of motion of the right drive block 88. The right drive block forms a recess 154 in its top surface. The wiper 156 of the potentiometer 150, which moves with the drive block 88 to change the resistance of the potentiometer 150, and thus the output signal therefrom, indicates the position of the drive block 88. The position of the drive block 88 indicates the displacement of the belt 70, and thus the adjusted gear ratio. The wiper 156 is positioned through the slot 152 and into the recess 154 formed in the drive block 88. The potentiometer 150 is then electrically connected to the computer display 40, and the signal is converted to the desired output, such as a bar graph, or a resistance scale, for observation by the user.

An electric or mechanical rpm sensor is positioned in operable engagement with the fan in order to monitor the rpms of the fan as the exercise machine is being used. The rpm sensor is electrically connected to the computer. The rpm data read by the sensor is communicated electrically to the computer, which converts the rpm data to watts (energy units in Joules per second). The resulting data in watts is displayed for the user's information. The conversion between fan 70 rpms and watts is made by testing the fan using a dynamometer. The dynamometer testing of the fan characterizes the energy required to rotate the particular fan design at a given rpm with a given drive train. The results of the characteristic testing are converted to an equation used to calculate rpm to watts for display on the computer display.

The rod 114 is rotatably supported on the frame structure 34 adjacent the position where the turn-handle 54 attaches to the end, to support the rod 114 during use and prevent bending of the rod at that point.

It is contemplated that the benefits of this invention can be obtained by using a tensioner assembly 74 that applies a force to displace only one of the belt spans 72, as opposed to both of the belt spans. It is also contemplated that the slave pulley 64 of the second pulley system could be a different type of split or variable pitch pulley, or it could be a normal pulley. In addition, the tensioner assembly could be applied to the first pulley system with the proper modifications to the surrounding structure.

The variable tension pulley system as described above is suitable for use in an upper body exercise machine 30 as shown in FIGS. 1 and 2, and as briefly described above. The upper body exercise machine 30 of the present invention has several advantages, such as it can be used in both seated and standing positions, and is also wheelchair accessible. The crank arms can be adjusted for either simultaneous or alternating arm action. The two stage belt drive, including the first 56 and second 66 pulley systems, attached to an air fan 70, provides smooth and quiet operation. The seat is fully adjustable to provide a custom fit for virtually any user. The length of the crank arms is also adjustable. In addition, the resistance can be set by the user with the actuation of the exercise tensioner assembly 74.

Figure 14:
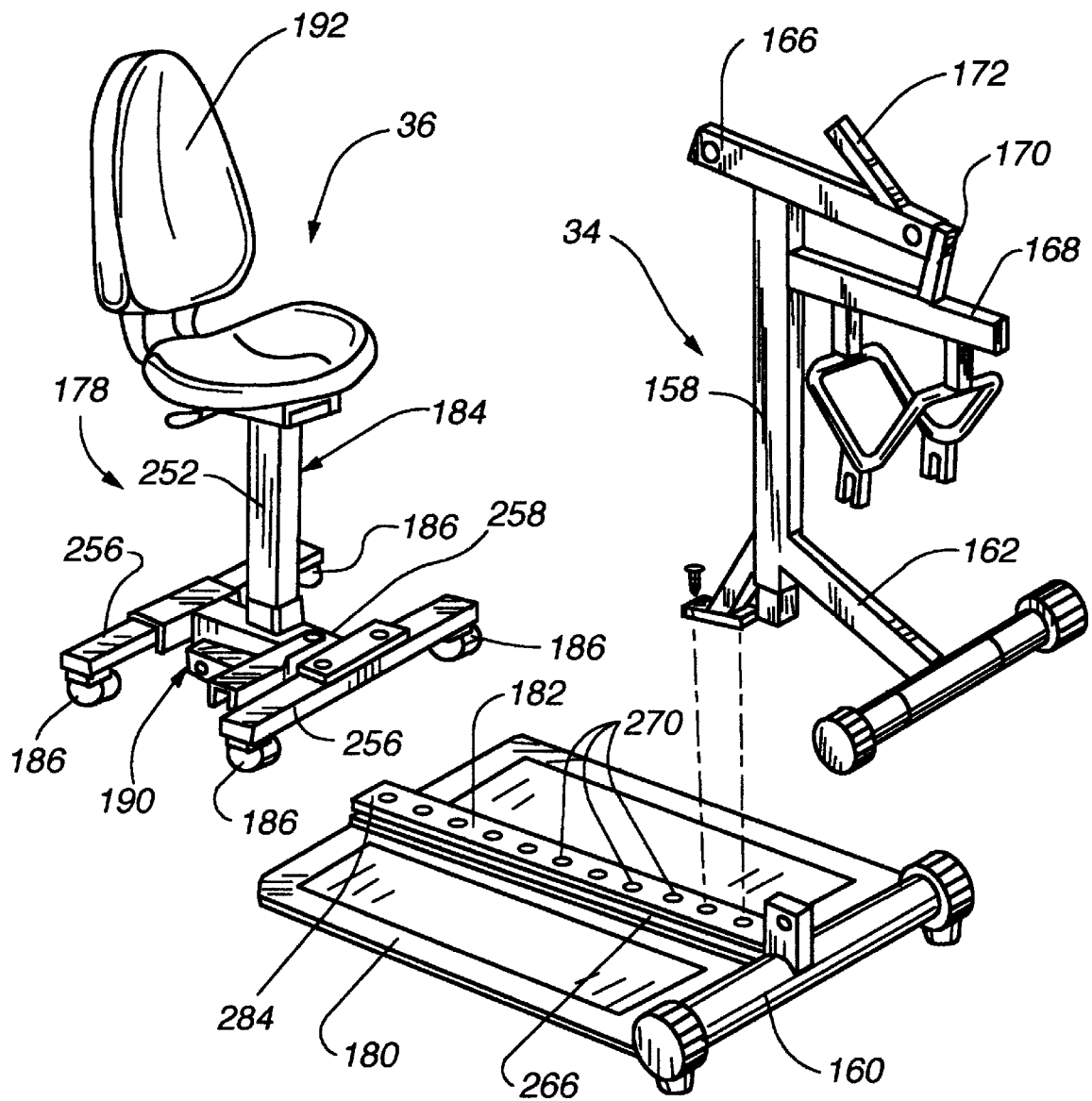
FIG. 14 is a partial exploded perspective view of the frame and seat structure of the present invention.
Figure 15:
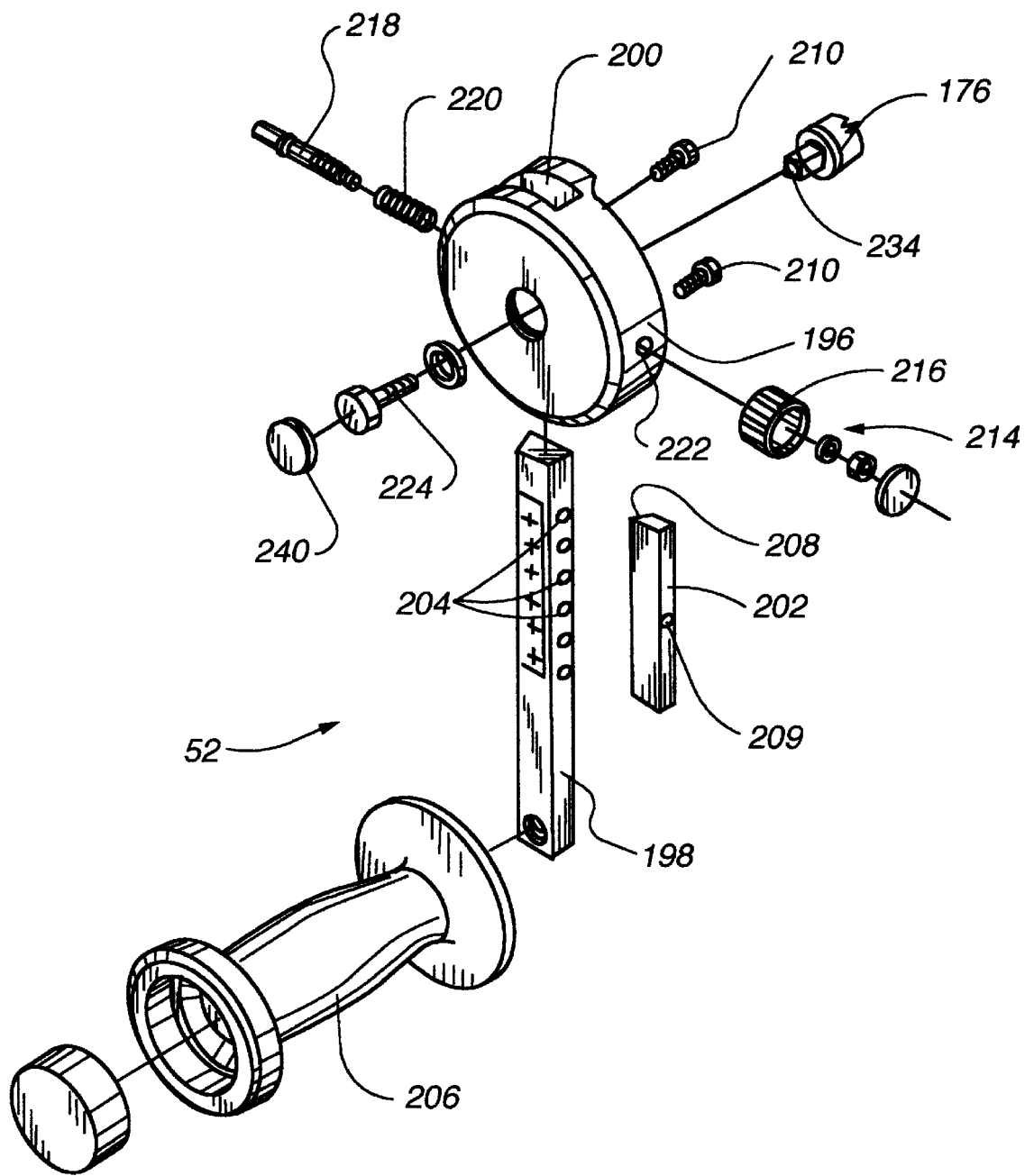
FIG. 15 is an enlarged exploded view of a crank arm assembly of the present invention.

Referring to FIGS. 1, 2 and 14, the frame structure 34 of the exercise machine includes a main upright support post 158 supported on a ground-engaging cross member 160. An angled brace 162 extends downwardly from a middle portion of the upright support post 158 to engage the support surface 164, the angled brace 162 extending underneath the fan 70, terminating in a smaller ground-engaging cross member 166. A laterally extending top crossbar 166 is mounted at the top of the upright support post 158. An arm 168 for supporting the tensioner assembly 72 extends outwardly from the upright post 158 below the top crossbar 166, and is attached to the upright post at one end and to the end of the top crossbar by a depending member 170. An angled computer display support arm 172 extends upwardly from the top crossbar 158 for supporting the exercise computer. A fan support harness 174 is attached to and depends from the support arm 168 for the tensioner assembly 74. The fan 70 is rotatably mounted in the fan support harness 174, and is able to be adjusted vertically in the harness as described below.

The top crossbar 158 supports the first pulley system 56 (FIG. 2), with the drive pulley 58 rotatably mounted to a first end of the top crossbar 158, and the slave pulley 60 rotatably mounted to a second end of the top crossbar 158. It should be noted that the pulleys of the first pulley system can be essentially timing gears where the pulleys have gear teeth, and the belt has associated notches or grooves for more and efficient direct drive control. The drive pulley 64 of the second pulley system 66 is mounted in rotational relationship with the slave pulley 60 of the first pulley system 56, as is described above. While the first pulley system 56 extends substantially horizontally, the second pulley system 66 extends substantially vertically with the slave pulley 68 of the second pulley system 66 fixedly attached to the fan 70. The different portions of the frame structure 34 are welded together for rigidity, and are typically made of rectangular steel tubing.

A crank arm assembly 52 is mounted on either end of an axle shaft 176 running through the center of the drive pulley 58 of the first pulley system 56. The rotation of the shaft 176 by the crank arm assemblies 52 causes the drive pulley 58 of the first pulley system 56 to rotate.

The top housing portion 42 surrounds the upper part of the frame structure 34, the entirety of the first pulley system 56, and a portion of the fan 50. The crank arm assemblies 52, the computer support arm 172 and the computer display 40 extend outside of the top housing portion 42. The lower housing portion 44 encloses the fan 50, and can be either solid or a vented wire cage. The top housing portion 42 is made of a molded plastic, and is divided into two lateral halves. The lateral halves mate together to form the housing.

The seating structure 178 occupied by the user is positioned at the base of the main support post 158 and extends in a direction opposite from the drive system and fan. The seating structure includes a base platform 180 engaging the support surface, a guide rail 182 extending down the middle of the base platform, and a rolling seat assembly 184. The rolling seat assembly 184 includes a plurality of wheels 186 engaging the top surface of the base platform. The wheels 186 allow the seat assembly 184 to move toward and away from the frame structure 34 depending on the user's desire. The seat assembly 184 is held in the proper orientation with the frame structure 34 by guide rollers 188 engaging the guide rail 182. A pop-pin structure 190 interacts between the base 190 of the rolling seat assembly 184 and the guide rail 182 to allow the user to easily and conveniently select the appropriate position of the rolling seat assembly 184 along the guide rail 182. The chair portion 192 of the rolling seat assembly 184 is vertically adjustable using a pop-pin structure 194. Any structure allowing vertical seat adjustment could be used, such as the spring-assisted air type found on common office chairs. The rolling seat assembly 184 is entirely removable from the base plate 180 to allow a user to exercise with the exercise machine while standing, or to allow access to the exercise machine 30 by a disabled person, such as one in a wheelchair. The upper surface of the base plate 180 is frictionally enhanced, for instance by having a frictional material applied thereto, to keep the user from slipping while using the exercise machine.

The crank arm assembly 52, fan harness 174 and seat structure 178 are defined in greater detail below.

Referring to FIGS. 1, 2, 15 and 16, the crank arm assembly 52 is attached to the drive pulley 58 of the first pulley system 56 through the top housing portion 42, and includes a collar member 196. The collar member 196 defines the shape of substantially a disk and is attached in a torque transmitting manner to the axle 176 running through the drive pulley 58 of the first pulley system 56. The rotation of the collar 196 by the user, as described below, also turns the drive pulley 58 of the first pulley system 56. The collar 196 supports the adjustable length and reversible crank arms 198. In the preferred embodiment, the collar 196 defines a diametrically extending channel 200. The channel has a profile to closely receive the crank arm 198 in conjunction with a spacer 202. A crank arm assembly 52 is attached at either end of the axle 176, and are identical to one another in structure.

The crank arm 198 has a trapezoidal cross section with the top 204 and bottom 206 surfaces being parallel, and the top surface being shorter than the bottom surface. The sides extending between the top and bottom surfaces are sloped, and each define a plurality of positioning recesses 204 spaced equally apart for receiving the end of a pop-pin, as described below. A position indicator scale 206 is mounted on the top surface of the crank arm by which the user can determine which positioning recess 204 is used for repeatedly setting the extension of the crank-arm 198 in a consistent extension position. The recesses are formed closer to one end of the crank arm 198 than the other, with the other end of the crank arm 198 attaching to a handle member 206 for gripping by the user.

The spacer 202 has a trapezoidal cross section and is positioned in the channel 200 alongside the crank arm 198.

The spacer has three sides at right angles, and a fourth sloped side 208. The back surface of the spacer is shorter than the parallel front surface of the spacer. A bore 209 is formed through the spacer from the sloped side 208 through the opposite side. The spacer 202 is loosely held in the collar 196 by retaining bolts 210 fitting through the collar 196 and into apertures 212 formed in the backside of the spacer. The spacer 202 has a length such that when it is inserted into the collar 196 it does not extend beyond or outside the collar 196. The sloped surface 208 of the spacer 202 engages a sloped surface of the crank arm 198 when the two are positioned next to each other in the channel 200.

The section shapes of the crank arm 198 and spacer 202 work together to wedge the crank arm and spacer tightly in the channel to avoid loose or sloppy action. The mating sloped surfaces work to this end.

Figure 17:
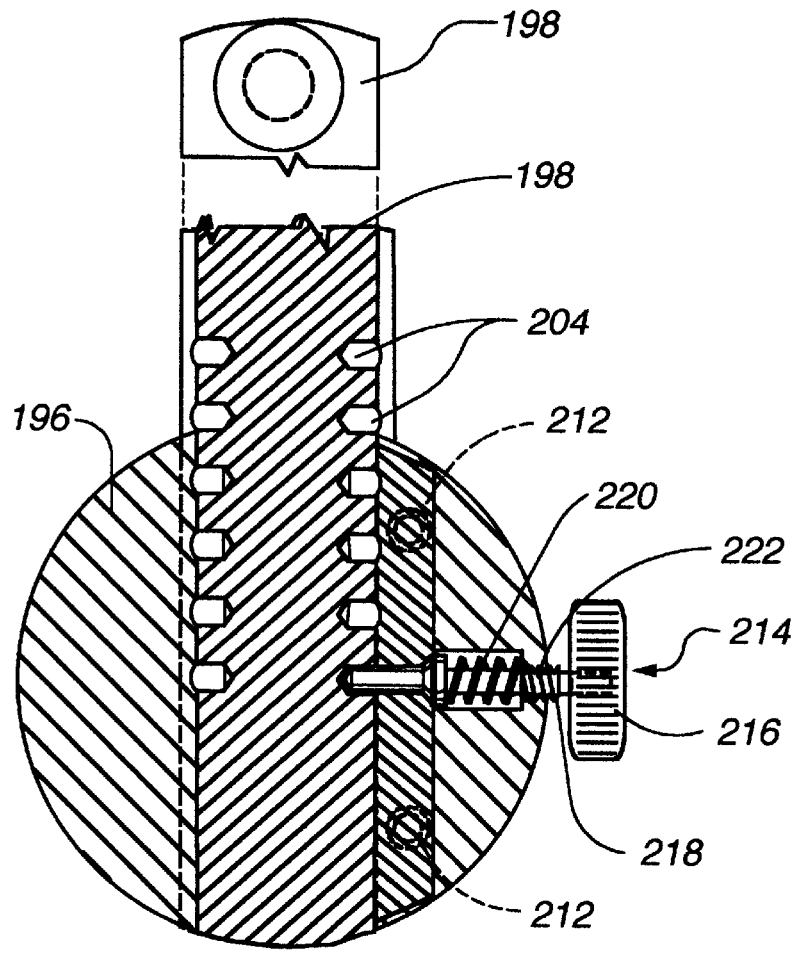
FIG. 17 is a section taken along lines 17—17 of FIG. 16, and shows the crank arm assembly.
Figure 16:
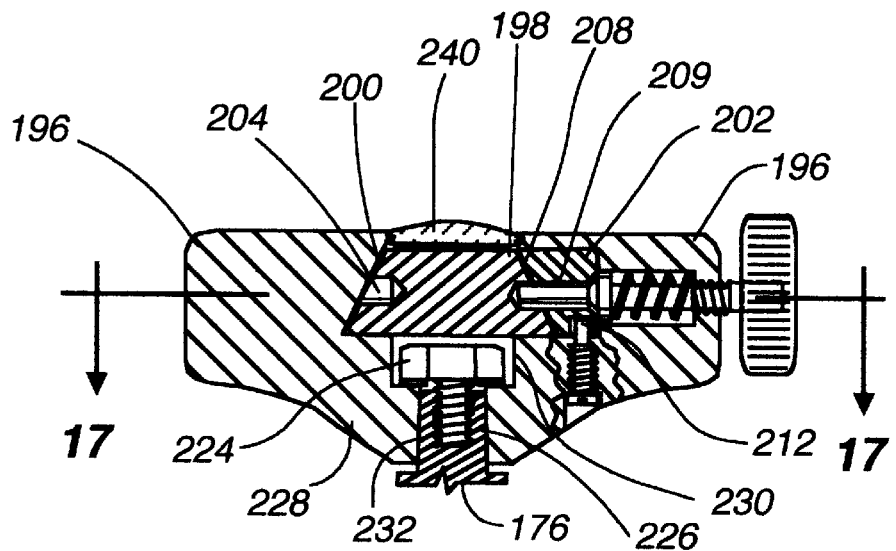
FIG. 16 is a section taken along lines 16—16 of FIG. 1, and shows the crank arm assembly.

A pop-pin 214 is supported by the collar to allow the length of extension of the crank arm 198 from the collar 196 to be adjusted as desired by the user. The pop pin structure 214 includes a handle 216, a pin 218, and a spring 220 disposed between the handle and the pin which biases the pin in an extended position. The pop pin 214 is positioned in a threaded aperture 222 formed through the peripheral edge of the collar 196 into the channel 200, as is shown in FIGS. 16 and 17. The bore 209 in the spacer 202 is positioned coextensively with the aperture 222 receiving the pop pin 214, such that the pin 218 extends through the bore 209 to reach the crank arm 198. When a positioning aperture 204 in the crank arm 198 is oriented in axial alignment with the bore 209 of the spacer 202, the pin 218 of the pop pin 214 assembly extends into the positioning aperture 204 and fixes the length of extension of the crank arm 198. To adjust the length of extension of the crank arm, the user simply unthreads the pop pin from the aperture 222, pulls the pop pin 214 outwardly to remove the pin 218 from the positioning aperture 204 in the crank arm 198. The crank arm 198 is then pushed into or pulled out of the collar 196 to shorten or lengthen the amount of extension of the crank arm from the collar, as is desired by the user, and then releases the pop pin 214 to engage the positioning aperture 204 to fix the position of the crank arm 198 and the collar 196.

The collar 196 is mounted to the axle 176 by engaging the end of the axle in a torque transmitting relationship. The collar 196 is then releasably secured to the end of the axle 176 with a fastener 224, such as a screw. More specifically, a bore 226 is formed through the base 228 of the collar 186. One end opens through the base of the collar, and the other end opens into the channel 200. The bore 226 has a threaded first portion 230 and a smooth-walled second portion 232. The second portion receives the end of the axle 176. Preferably, the end of the axle 176 is square tapered, and the second portion 232 of the bore 236 is square tapered also such that the end of the axle 176 is inserted into the bore 226 in a mating relationship, creating a torque transmitting relationship. The collar 196 is held in engagement with the axle 176 by a screw fastener 224 inserted into a threaded recess 234 formed axially in the square end of the axle. A large aperture 238 is formed coextensively with the bore on the first or front surface of the collar 196. The centrally positioned aperture 238 allows the insertion of the fastening members to connect the collar 196 to the axle 176, and also allows the user to view the scale on the front surface of the crank arm 198 for determining the position of the crank arm 198 with respect to the collar 196. The aperture can receive a magnifying insert 240 to assist in viewing. It should be noted that the channel 200 can be open along its length on the front surface of the collar, since the section shape of the crank arm and spaces will act to hold the arm in the channel.

There is a crank arm assembly 52 on either side of the top housing portion 42, attached to either end of the axle 176 through the drive pulley 58 of the first pulley system 56. The crank arm 198 in each crank arm assembly 52 can be reversed to allow the crank arms 198 to extend in the same direction as one another for unitary movement, or to extend 180 degrees offset from one another for an alternating type of movement. The orientation of the crank arm 198 is adjusted or changed by actuating the pop pin 214 (unscrewing if necessary) to remove the pin 218 from the positioning aperture 204 in the crank arm 198, removing the crank arm 198 entirely from the channel 200 in the collar 196, reinserting the crank arm through the other end of the collar and positioning as desired using the pop pin. The different orientations of the crank arms provide different exercising benefits.

Figure 18:
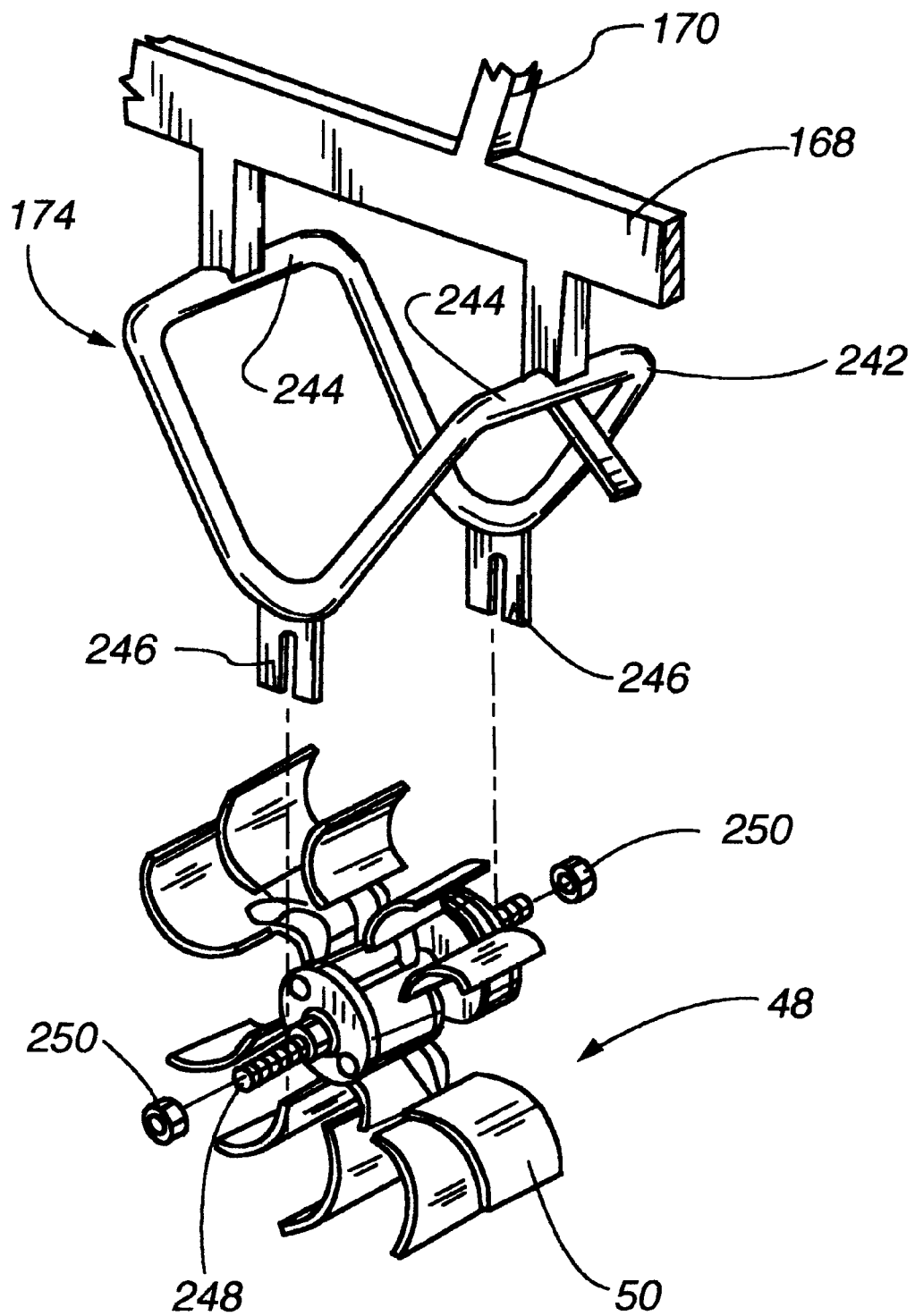
FIG. 18 is a partial exploded view of the fan harness and the fan.

Referring to FIG. 18, the fan harness 174 includes a tubular frame member 242 having a rectangular shape in the horizontal plane and a V-shape in the vertical plane. The short ends 244 of the harness are supported from the support arm 168 for the tensioner assembly 74. The bottom of the "V"-shaped fan harness has two sides. A slotted bracket 246 with a downwardly directed opening is attached to the valley on each of the sides. The fan 50 is received in the fan harness 174 with the opposing ends of the axle 248 of the fan 50 extending into each of the slotted brackets 246. The axle 248 is secured to the slotted brackets 246 by threaded fasteners 250 and clamped thereon. The fan 50 is rotatably mounted to the axle 248. The slave pulley 68 of the second pulley system 66 is attached to the axle 248 in a rotatably fixed relationship with the fan 50 such that when the slave pulley 68 is rotated, the fan 50 also rotates.

The position of the fan 50 is adjustable in the vertical direction within the slotted brackets 246. The fan height can be adjusted by loosening the threaded fasteners 250 and moving the fan upwardly or downwardly, as desired, and refastening the retainers to fix the location of the fan 50 in the slotted brackets 246. The vertical adjustment of the fan 50 is important to allow adjustment of the tension in the belt 70 of the second drive system. As the belt 70 is used, it may stretch and require readjustment to allow the tensioner assembly to work properly.

Figure 19:
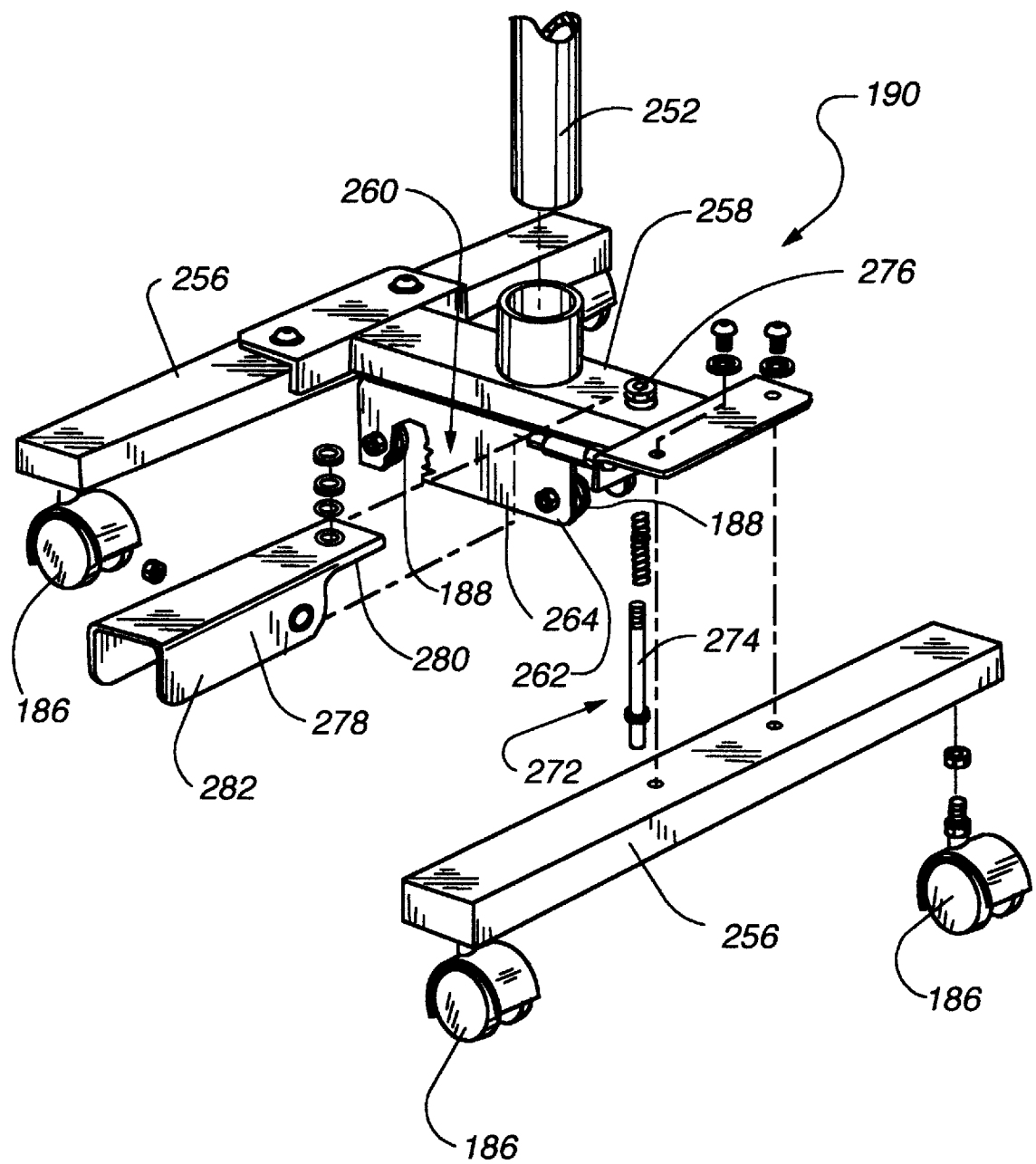
FIG. 19 is a partial exploded view of the base assembly of the seat structure.
Figure 20:
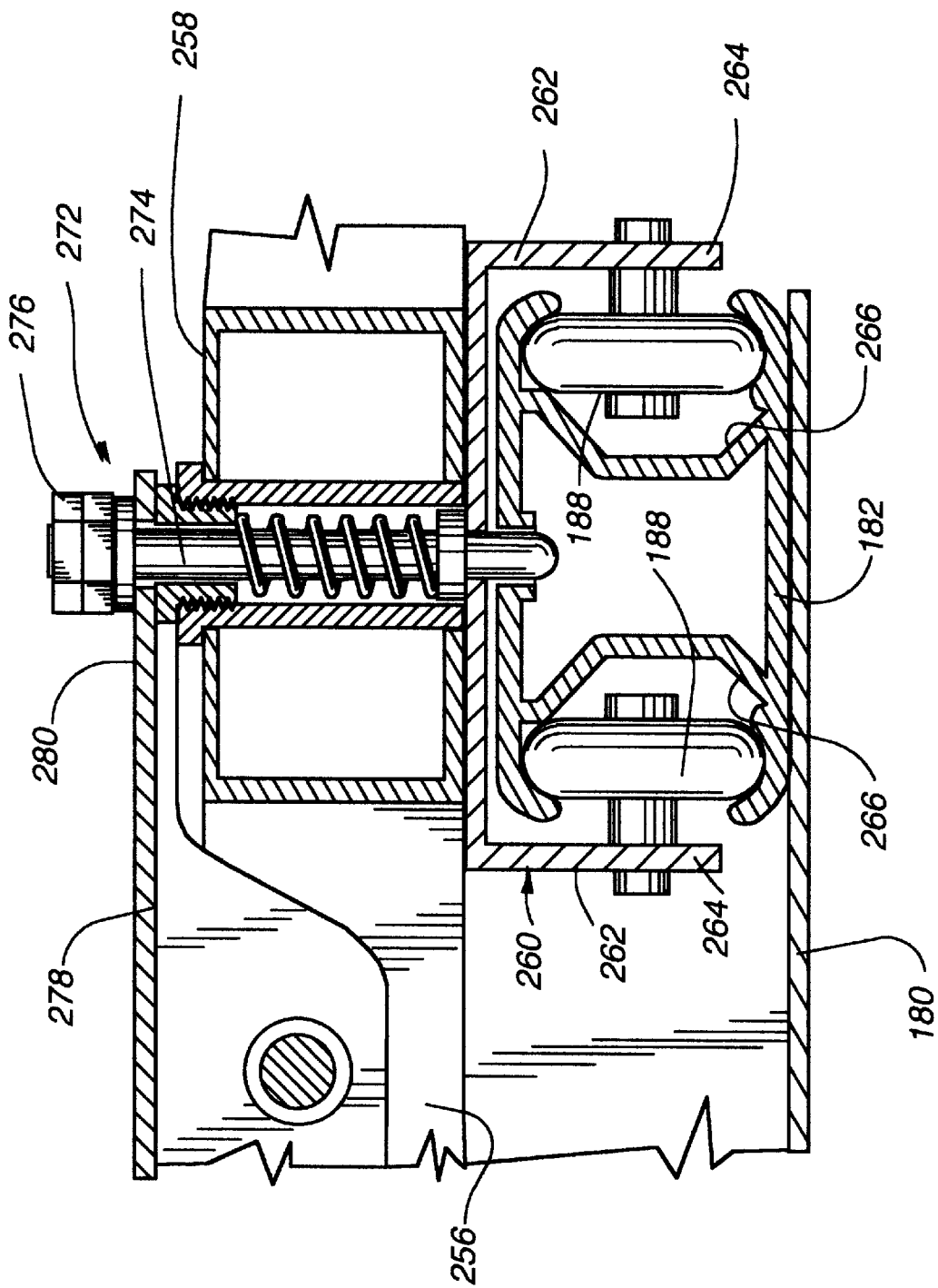
FIG. 20 is a section taken along lines 20—20 of FIG. 1.

Referring now to FIGS. 1, 19 and 20, the seat assembly 184 is described. The base 190 of the seat assembly 184 supports the seat post 252 upon which the chair 192 is adjustably mounted. The seat post 252 defines an interior cavity which receives the chair post 254, the chair post 254 being attached to the bottom of and extending downwardly from the chair 192. The chair post 254 defines a plurality of openings in a front surface, while the seat post supports a spring-loaded pop pin for selective engagement in any one of the plurality of apertures, thus allowing the vertical adjustment of the chair upon the seat post.

The base 190 of the seat assembly 184 includes two cross members 256 spaced apart and attached together by a transverse member 258 to form an H-shaped structure. Each cross member defines opposing ends, with a roller or caster wheel 186 rotatably mounted to each opposing end for engagement with the platform 180. The casters 186 allow the seat assembly to roll forwardly and rearwardly on the platform. Alternatively, the rolling means 180 mounted on the opposing end of each cross member 256 can be a wheel mounted on an axle between two downwardly depending flanges.

The movement of the seat assembly 184 on the plate 180 is preferably controlled by the engagement of the guide wheels 188 with the guide rail 182. As shown in FIGS. 1, 19 and 20, a guide wheel assembly 260 is mounted to the bottom surface of the transverse member 258. The guide wheel assembly 260 includes a U-shaped bracket 262 with the base of the bracket mounted to the bottom surface of the transverse member 258, and the opposing legs 264 of the bracket extending downwardly. A guide wheel 188 is mounted at each corner of the downwardly extending legs 264. The guide wheel assembly 260 is shaped such that the guide wheels 188 engage the guide rail 182 to allow only substantially direct forward and backward movement of the seat assembly on the platform.

The guide rail 182 is mounted down the center of the platform 180 and defines outer longitudinal edges forming C-shaped grooves 266 for receiving the guide wheels 188. The guide rail 182 can be spaced off the platform by spacers 268 if necessary to adjust for the desired engagement of the guide wheels 188 with the guide rail 182. The C-shaped grooves 266 are continuous along the length of the guide rail 182. Alternatively, the guide rail 182 can have differently shaped grooves, or no grooves at all. If used with the properly oriented guide rollers, these alternative configurations can also work to provide adequate directional stability. The C-shaped grooves 266 do provide lateral support to the guide rollers 188 as they somewhat surround the guide rollers 188.

As mentioned above, the top of the guide rail 182 defines a plurality of spaced apertures 270. A pop pin structure is mounted on the base 190 of the seat assembly 184, preferably on the transverse member 258, and can be either hand operated or operated by a foot lever. The pop pin structure 272 includes a pin 274 having a retainer flange formed annularly adjacent one end, a compression spring positioned over the length of the spring and in engagement with the flange, and a handle 276 attached to the other end of the pin. The pin is positioned in an aperture formed in the base member 190 of the seat assembly 184 with one end of the compression spring in engagement with the bottom or interior surface of the frame portion through which the pin extends. The pin is biased in a downwardly extended position to fit into one of the apertures 270 formed in the top surface of the guide rail 182 to fix the position of the guide rail.

The user simply pulls upwardly on the handle of the pop pin 272 to compress the spring and retract the pin from the positioning aperture. This allows the seat assembly to move forwardly or rearwardly along the guide rail to the desired location, where the user releases the pop pin 272 assembly which extends into the newly selected positioning aperture 270 under the force of the compression spring. Alternatively, a lever 278 actuated by the user's foot can be used to retract the pop pin. The lever is pivotally mounted to a frame member of the base assembly 190 adjacent the pop pin 272. The lever 278 has an actuating end 280 which engages the pop pin 272, and a depression end 282 at the opposite end of the lever from the actuating end. To actuate the pop pin, the user depresses the depressing end 282, which causes the actuating end 280 to lift upwardly, and thus retracts the pop pin 272 from the positioning aperture 270. When the seat assembly 184 is then positioned in the proper location and the new positioning aperture 270 is selected by the user, the user releases the depressing end 282 of the lever 278, and the lever is then biased back to its unactuated position at the same time the pin is inserted into the positioning aperture under the bias force of the compression spring. The lever actuation of the pop pin allows the user to adjust the position of the seat assembly 184 with respect to the exercise machine 30 along the guide rail 182 without having to bend over to manually grasp the pop pin 272 with the user's hand. Typically the user's foot is used to depress the lever and actuate the pop pin. This feature is for people with limited range of motion. The seat assembly 184 can be removed from the platform 180 by moving the back assembly 190 away from the support post 158 until the guide wheel assembly 260 disengages from the guide rail 182. The distal end 284 of the guide rail is open (the C-shaped grooves 266 are open) to allow the guide rollers 186 to disengage from the guide rail 182. The guide rollers 186 can be re-engaged to the guide rail 182 by inserting the guide rollers into the guide rail.

The exercise machine 30 as described herein, including the tensioner assembly 76 of the present invention, allows a user to exercise their upper body while standing or sitting. In addition, the user can change the resistance of the exercise machine 30 by manipulating the turn-handle 54 to actuate the tensioner assembly as described above. The performance of the user is monitored and displayed by the computer. The user can also emphasize different exercise benefits by changing the extension of the crank arms 198 from the collars 196 in the crank assemblies 52, or by reorienting the crank arms 198 to extend in the same direction from the crank arm assemblies 52. In addition, the crank arms 198 can extend in opposite directions from the crank arm assemblies 52, as also described above. The seat assembly 184 is able to be adjusted to be closer to or further away from the exercise system by rolling the base assembly along the platform to a desired position and fixing the position with the pop pin structure. The orientation of the seat assembly 184 as it rolls along the platform is properly maintained by the engagement of the guide wheels with the guide rail.

Sloped foot rests can be provided at the base of the support post 158, on either side thereof, for the placement of the user's foot when seated in the seat assembly. The foot rests are plates fixed to the frame structure in a sloped orientation for comfortable engagement by the user's feet.

Although the present invention has been described with a certain degree of particularity, it is understood that the present disclosure has been made by way of example, and changes in detail or structure may be made without departing from the spirit of the invention, as defined in the appended claims.

I claim:

1. A variable tension pulley system comprising:
 a. a drive pulley;
 b. a slave pulley;
 c. a belt interconnecting and engaging the drive pulley and slave pulley, sections of the belt extending between the drive and slave pulleys defining opposing belt spans; and
 d. a tensioner assembly positioned between the drive pulley and the slave pulley, and in engagement with the belt, the tensioner assembly comprising:
  i. an elongated rack;
  ii. a drive member having opposing ends and rotatably positioned on the rack, and being selectively actuable in a positive direction or a negative direction;
  iii. a pair of drive blocks, one each positioned on each opposing end of the drive member and in moveable engagement with the rack, each of the drive blocks being moveable along the length of the drive member upon actuation of the drive member, the drive blocks moving toward each other when the drive member is actuated in the positive direction, and the drive blocks moving away from each other when the drive member is actuated in the negative direction;

iv. a pair of slide blocks, one each slidably positioned on the drive member in selective engagement with each drive block, and in slidable engagement with the rack, each slide block being moved toward the other slide block by the associated drive block when the drive blocks are moved toward each other;

v. a tensioner pulley attached to each slide block and in engagement with one of the opposing belt spans, wherein the tensioner pulleys displace the opposing belt spans closer together upon positive actuation of the drive member in the positive direction; and vi. a spring attached between opposing slide blocks to bias the slide blocks inwardly to engage said belt.

2. A variable tension pulley system comprising:
a. a drive pulley;
b. a slave pulley,
c. a belt interconnecting and engaging the drive pulley and slave pulley, sections of the belt extending between the drive and slave pulleys defining opposing belt spans; and
d. a tensioner assembly positioned between the drive pulley and the slave pulley, and in engagement with the belt, the tensioner assembly comprising:
  i. an elongated rack;
  ii. a drive member positioned on the rack, the drive member having opposing ends and being selectively actuable in a positive direction or a negative direction;
  iii. a drive block positioned on an end of the member and in moveable engagement with the rack, the drive block being moveable along the length of the member upon actuation of the drive member, the drive block moving toward the belt when the drive member is actuated in the positive direction, and the drive block moving away from the belt when the drive member is actuated in the negative direction;
  iv. a slide block slidably positioned on the drive member adjacent to, inside of and in selective engagement with the drive block, and in slidable engagement with the rack, the slide block being moved toward the belt by the associated drive block when the drive block is moved;
  v. a tensioner pulley attached to the slide block, the tensioner pulley in engagement with one of the opposing belt spans, wherein the tensioner pulley displaces the belt span inwardly upon positive actuation of the tensioner system in the positive direction; and
  vi. a biasing means attached to the slide blocks to bias the slide blocks inwardly toward the belt.

3. A variable tension pulley system as defined in claim 2, wherein the biasing means is a spring attached between the frame structure and the slide block to bias the slide block to engage the belt.

4. A variable tension pulley system comprising:
a. a drive pulley;
b. a slave pulley;
c. a belt interconnecting and engaging the drive pulley and slave pulley, sections of the belt extending between the drive and slave pulleys defining opposing belt spans; and
d. a tensioner assembly positioned between the drive pulley and the slave pulley, and in engagement with the belt, the tensioner assembly comprising:
  i. an elongated rack;
  ii. a drive member having opposing ends and rotatably positioned on the rack, and being selectively actuable in a positive direction or a negative direction;
  iii. a pair of drive blocks, one each positioned on each opposing end of the drive member and in moveable engagement with the rack, each of the drive blocks being moveable along the length of the drive member upon actuation of the drive member, the drive blocks moving toward each other when the drive member is actuated in the positive direction, and the drive blocks moving away from each other when the drive member is actuated in the negative direction;
  iv. a pair of slide blocks, one each slidably positioned on the drive member in selective engagement with each drive block, and in slidable engagement with the rack, each slide block being moved toward the other slide block by the associated drive block when the drive blocks are moved toward each other; and
  v. a tensioner pulley attached to each slide block and in engagement with one of the opposing belt spans, wherein the tensioner pulleys displace the opposing belt spans closer together upon positive actuation of the drive member in the positive direction;
e. a potentiometer operably attached to the rack, the potentiometer having a slidable wiper;
f. the wiper attached to one of the slider blocks to move in conjunction therewith, the potentiometer generating an electrical signal in relation to the position of the wiper;
g. a computer display operably attached to the potentiometer to receive and display the electrical output from the potentiometer.

* * * * *